(12) United States Patent
Keeler

(10) Patent No.: US 7,099,993 B2
(45) Date of Patent: Aug. 29, 2006

(54) MULTI-LEVEL CACHING IN DATA STORAGE DEVICES

(75) Inventor: Stanton M. Keeler, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 383 days.

(21) Appl. No.: 10/670,148

(22) Filed: Sep. 24, 2003

(65) Prior Publication Data

US 2005/0066121 A1    Mar. 24, 2005

(51) Int. Cl.
*G06F 12/00* (2006.01)
(52) U.S. Cl. .................... 711/113; 711/112; 711/122
(58) Field of Classification Search ............... None
See application file for complete search history.

(56) References Cited

U.S. PATENT DOCUMENTS

| | | | |
|---|---|---|---|
| 4,967,789 A | 11/1990 | Kypris | |
| 5,289,581 A | 2/1994 | Berenguel | |
| 5,293,484 A | 3/1994 | Dabbas | |
| 5,337,197 A | 8/1994 | Brown | |
| 5,353,410 A | 10/1994 | Macon | |
| 5,414,850 A | 5/1995 | Whiting | |
| 5,515,500 A | 5/1996 | Mizuno | |
| 5,619,728 A | 4/1997 | Jones | |
| 5,652,857 A | 7/1997 | Shimoi | |
| 5,668,976 A | 9/1997 | Zook | |
| 5,719,885 A | 2/1998 | Ofer | |
| 5,736,369 A | 4/1998 | Bowen | |
| 5,766,382 A | 6/1998 | Hertzog | |
| 5,778,418 A | 7/1998 | Auclair | |
| 5,784,390 A | 7/1998 | Masiewicz | |
| 5,787,466 A | 7/1998 | Berliner | |
| 5,835,939 A | 11/1998 | Kurokawa | |
| 5,887,199 A | 3/1999 | Ofer | |
| 5,974,547 A | 10/1999 | Klimenko | |
| 6,003,115 A | 12/1999 | Spear | |
| 6,016,530 A | 1/2000 | Auclair | |
| 6,018,626 A | 1/2000 | Zook | |
| 6,145,026 A | 11/2000 | Ziegler | |
| 6,156,197 A | 12/2000 | Dessapt | |
| 6,177,853 B1 | 1/2001 | Nagatomi | |
| 6,192,492 B1 | 2/2001 | Masiewicz | |
| 6,229,658 B1 | 5/2001 | Donner | |
| 6,249,845 B1 | 6/2001 | Nunez | |
| 6,266,298 B1 | 7/2001 | Tsai | |
| 6,334,075 B1 | 12/2001 | Mase | |
| 6,359,531 B1 | 3/2002 | Natatomi | |

(Continued)

OTHER PUBLICATIONS

Hui Su et al., Patent Application entitled: "Fast Disc Write Mechanism in Hard Disk Drives", STL 10927.01., having a U.S. Appl. No. 60/392,959, filed: Jul. 1, 2002, pp. 1-3.

*Primary Examiner*—Mano Padmanabhan
*Assistant Examiner*—Kaushik Patel
(74) *Attorney, Agent, or Firm*—Westman, Champlin & Kelly

(57) ABSTRACT

A multi-level caching scheme for use in managing the storage of data on a data storage device is disclosed. The data is received by the data storage device as part of a write command issued by the sending interface and specifying one or more particular location(s) on the data storage device to which the data is/are to be stored. The data storage device utilizes a first level (L1) and a second level (L2) of cache memory to temporarily store the received data prior to commission to the specified storage location(s). In this embodiment, the data storage device first sends the data to the L1 cache memory, and subsequently thereafter, the data storage device transfers the data from the L1 cache memory to the L2 cache memory. Eventually, the data storage device transfers the data from the L2 cache memory to the specified storage location(s).

34 Claims, 15 Drawing Sheets

U.S. PATENT DOCUMENTS

| | | |
|---|---|---|
| 6,385,711 B1 | 5/2002 | Colligan |
| 6,402,959 B1 | 6/2002 | Dessapt |
| 6,418,509 B1 | 7/2002 | Yanai |
| 6,434,663 B1 | 8/2002 | Grimsrud |
| 6,445,266 B1 | 9/2002 | Nagatomi |
| 6,522,604 B1 | 2/2003 | Tsai |
| 6,539,460 B1 | 3/2003 | Castelli |
| 6,567,817 B1 | 5/2003 | VanLeer |
| 6,598,119 B1 * | 7/2003 | Becker et al. .............. 711/119 |
| 6,754,783 B1 * | 6/2004 | Tsern et al. ................. 711/144 |
| 2002/0012293 A1 | 1/2002 | Tsai |
| 2002/0023225 A1 | 2/2002 | Lomnes |
| 2002/0063613 A1 | 5/2002 | Nagatomi |
| 2002/0065982 A1 | 5/2002 | Colligan |
| 2002/0099907 A1 | 7/2002 | Castelli |
| 2002/0108016 A1 | 8/2002 | Haines |
| 2002/0159355 A1 | 10/2002 | Heylen |
| 2004/0088479 A1 * | 5/2004 | Hall ........................... 711/112 |
| 2004/0215885 A1 * | 10/2004 | Cargnoni et al. ........... 711/135 |

* cited by examiner

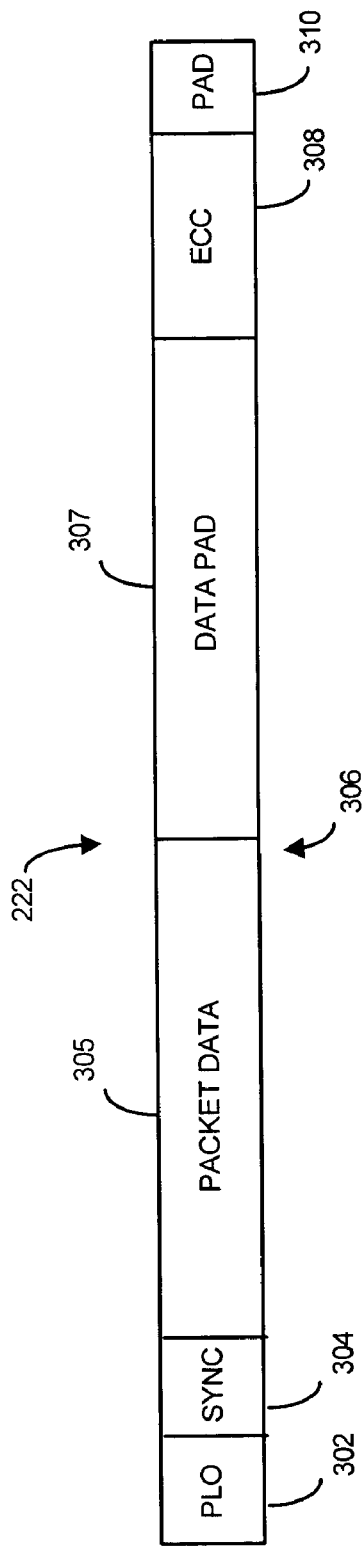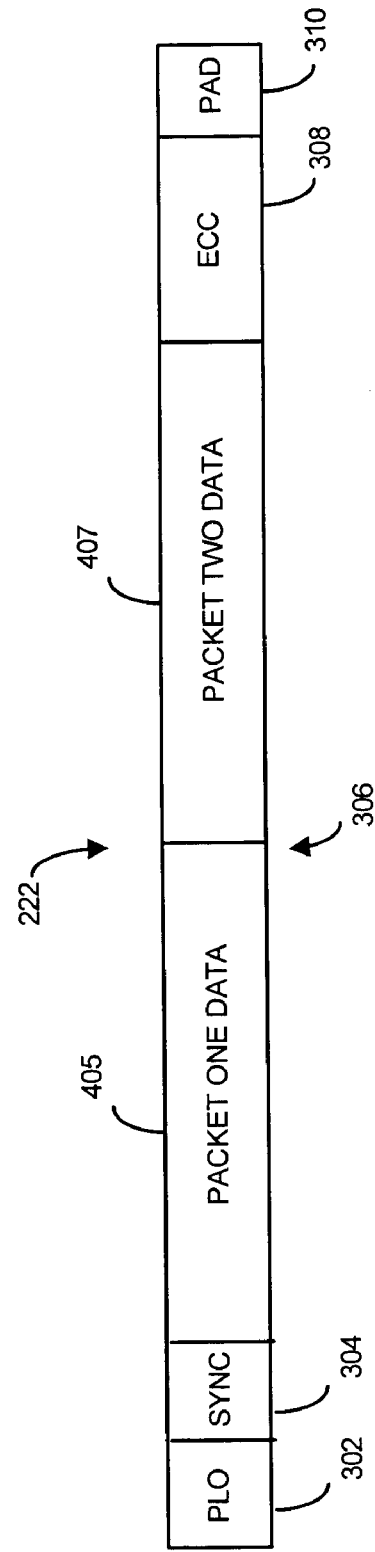

MULTI-LEVEL CACHING IN DATA STORAGE DEVICES

FIELD OF THE INVENTION

This invention generally relates to data storage devices and, more particularly, to multi-level caching schemes for use in a transferring data between a data storage device and a host system.

BACKGROUND OF THE INVENTION

Modern computer operating systems and application software generally transmit data to and receive data from disc drives in one or more 512 byte data packets. In addition, host computers expect to have access to the data stored on a disc drive at 512 byte boundaries. Given the 512 byte data packet size generally used by host computers today, the size of the data region of the physical sectors in most disc drives is also 512 bytes. The data regions of the physical sectors commonly used on disc drive magnetic media are preceded and followed on the disc by several overhead fields data region. The error correction code (ECC) field, which detects bit errors in the host data of a particular sector, is one of these overhead fields.

The demand for a more reliable computer is continuously increasing in the consumer market. As such, disc drive manufacturers are constantly trying to improve the data integrity on a disc drive. One such approach is to increase the ECC field size. However, increasing ECC field size alone results in an increase in storage overhead beyond an acceptable level. Another approach to increasing data integrity involves increasing the size of the data region proportional to the increase in the ECC field size. This approach maintains approximately the same percentage of storage overhead for the disc drive, while at the same time, providing for desired improvements in data integrity.

Increasing the size of the data region on disc sectors in a disc drive mandates an increased size of packets sent from a sending interface, e.g., host computer, to the disc drive. Coordinating modifications to host systems and disc drives in order to accommodate a change in both data region size and packet size creates logistical problems. Host system developers and disc drive manufacturers both need to coordinate their development activities so that both are ready to implement their respective changes at the same time. To that end, accommodating such a change is also a significant financial expense for both industries.

SUMMARY OF THE INVENTION

In accordance with the present invention, the above and other problems are solved by a multi-level caching scheme for use in managing the storage of data in a data storage device. In an embodiment, the data is received by the data storage device as part of a write command issued by a sending interface (e.g. host computer). The write command specifies one or more primary storage location(s) within the data storage device to which the data are to be stored. Upon receipt of the write command, and thus the data, a process is initiated in the device by which storage of the data to the specified storage location(s) is managed.

In an embodiment, the data storage device utilizes a first level (L1) and a second level (L2) of cache memory to temporarily store the received data prior to commission to the specified storage location(s). In this embodiment, the data storage device first sends the data to the L1 cache memory, and subsequently thereafter, the data storage device transfers the data from the L1 cache memory to the L2 cache memory. Eventually, the data storage device transfers the data from the L2 cache memory to the specified storage location(s).

The times at which data transfer is initiated between the L1 cache memory and the L2 cache memory and/or between the L2 cache memory and the specified storage location(s) may be dependent upon occurrence of a predetermined threshold condition. For instance, in accordance with one embodiment, either one of these data transfer events may be initiated after operation of the data storage device goes idle, meaning that the device is not performing any data storage or retrieval operations. In another embodiment, the predetermined threshold condition may relate to the percentage of used or available capacity in the cache (L1 or L2) from which the transfer is initiated. In this embodiment, the applied percentage factor (either availability or use) is analyzed against a predetermined percent capacity to determine whether such a transfer should be initiated. For example, data may be transferred from the L1 cache memory to the L2 cache memory if the percentage of capacity currently available in the L1 cache falls below the predetermined percent capacity, which in this analysis relates to available capacity. Alternatively, data may be transferred from the L1 cache memory to the L2 cache memory if the percentage of capacity currently being used in the L1 cache exceeds the predetermined percent capacity, which in this analysis relates to used capacity.

It is contemplated that the data storage device may be a disc drive in which data is stored on one or more recordable disc media. The recordable disc media is divided into tracks, and the tracks are divided further into sectors, which serve as the primary storage locations specified for packet storage by sending interfaces. In this embodiment, the L2 cache memory may be located on a reserved group of tracks located on any portion of the recordable disc media. For example, the L2 cache memory may reside on the outer periphery of the disc media.

In accordance with another disc drive embodiment of the present invention, data sent from the sending interface to the drive for storage on the media may be in the form of packets that are sized smaller than data region of the sectors on the recordable media. For instance, the packets may be 512 bytes in length, whereas the data region of these sectors may be 1024 bytes in length, 1536 bytes in length, 2048 bytes in length, etc. In this embodiment, multiple packets stored in the L1 cache may be directly transferred to a single sector if these multiple packets align in a manner that the packets will be stored to the entire allocated data capacity of the sector. As such, these multiple packets skip being temporarily stored in the L2 cache memory. Packets that do not align in this manner are transferred to the L2 cache memory as described above and written to the specified disc sector(s) using a process wherein data currently stored on the sector(s) is first read into cache, then modified with the current data, and finally written back to the sector(s).

Embodiments of the invention may be implemented as an article of manufacture such as a solid state, non-volatile memory device or a computer-readable program storage device. The computer-readable program storage device may be a computer storage media readable by a computer processor and encoding a computer program of instructions for executing a computer process. The computer-readable program storage device may also be a propagated signal on a carrier readable by a computer processor and encoding a computer program of instructions for executing a computer process.

These and various other features as well as advantages which characterize the present invention will be apparent from a reading of the following detailed description and a review of the associated drawings.

BRIEF DESCRIPTION OF THE DRAWINGS

FIGS. 4-1 through 4-4 illustrate exemplary structures for the data sectors of FIG. 3 in accordance with various embodiments of the present invention.

FIG. 5-1 is a logical representation of a stream of data packets sent from a sending interface to a data storage device for storage to recordable media in accordance with a multi-tier caching process embodiment of the invention.

FIGS. 5-2 through 5-10 depict a logical structure of storage and caching regions for administering the multi-tier caching process used to effectuate the storage of the stream of data packets of FIG. 5-1 to the recordable media.

FIG. 6 is a flow diagram that illustrates operational characteristics of a multi-tier caching process for storing data to recordable media in a data storage device in accordance with an embodiment of the present invention.

FIG. 7 depicts a logical illustration of the operational characteristics of the multi-tier caching process of FIG. 6.

FIG. 8 is a flow diagram that illustrates operational characteristics of the multi-tier caching process of FIG. 6 in more detail in accordance with an embodiment of the invention.

FIG. 9 is a flow diagram that illustrates operational characteristics of the multi-tier caching process of FIG. 6 in more detail in accordance with another embodiment of the invention.

FIG. 10 is a flow diagram that illustrates operational characteristics of the multi-tier caching process of FIG. 6 in more detail in accordance with yet another embodiment of the invention.

DETAILED DESCRIPTION

Figure 1:
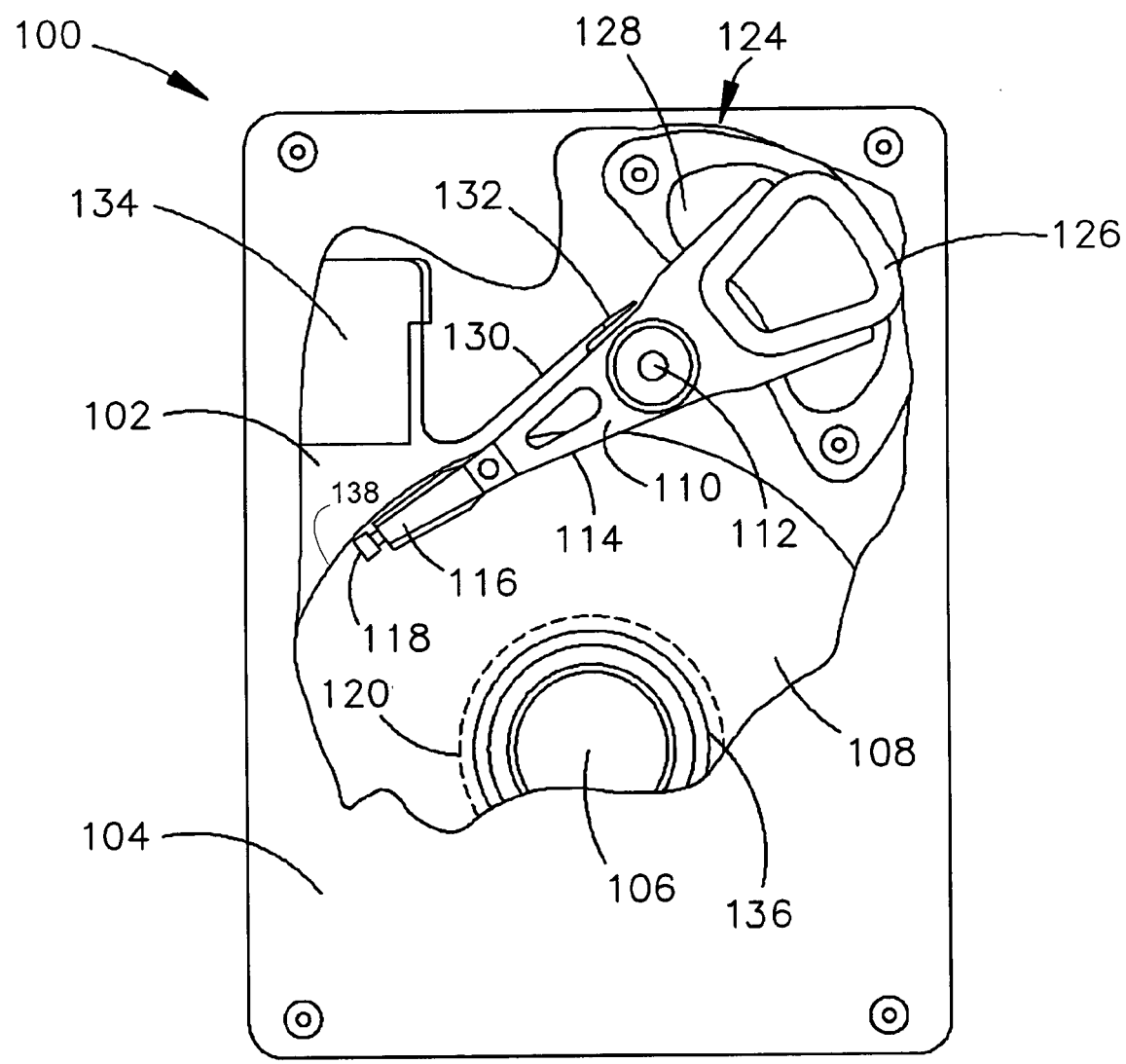
FIG. 1 is a plan view of a disc drive showing the primary internal components and incorporating an embodiment of the present invention.

The present invention and its various embodiments are described in detail below with reference to the figures. When referring to the figures, like structures and elements shown throughout are indicated with like reference numerals.

A disc drive 100 constructed in accordance with an embodiment of the present invention is shown in FIG. 1. It should be appreciated that the disc drive 100 may be replaced with any type of data storage device. Indeed, the disc drive 100 is shown as an illustration of an embodiment, and thus is not intended to limit the scope of the present invention. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106 that rotates one or more discs 108 at a constant high speed. Information is written to and read from tracks on the discs 108 through the use of an actuator assembly 110, which rotates about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is a read/write head 118 that includes an air bearing slider enabling the read/write head 118 to fly in close proximity above the corresponding surface of the associated disc 108.

The spindle motor 106 is typically de-energized when the disc drive 100 is not in use for extended periods of time. The read/write heads 118 are moved over park, or landing, zones 120 near the inner diameter 136 of the discs 108 when the drive motor is de-energized. The read/write heads 118 may be secured over the landing zones 120 through the use of an actuator latch arrangement, which prevents inadvertent rotation of the actuator assembly 110 when the heads 118 are parked. Although the landing zone 120 is shown in FIG. 1 as located in close proximity to the inner diameter 136 of the discs 108, a landing zone 120 may also be located in close proximity to an outer diameter 138 of the discs 108. Furthermore, a landing zone 120 may be located on any portion of the discs 108 between the outer diameter 138 and the inner diameter 136 of the discs 108. Alternatively, the read/write heads 118 may be removed from the surface of the discs 108 by load/unload ramps positioned in close proximity to the outer diameter 138 when the drive motor is de-energized. As such, the read/write heads 118 may be secured by the ramps to prevent inadvertent rotation of the actuator assembly 110 when the discs 108 are spinning at a velocity insufficient to maintain an air bearing between the sliders and the discs 108. The heads 118 are maintained on the ramps in the park position through the use of an actuator latch arrangement, which prevents inadvertent rotation of the actuator arms 114 when the heads are parked. This latch arrangement is typically a magnetic latch that magnetically holds the actuator against a stop.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base 102 to a disc drive printed circuit board (not shown) mounted to the bottom side of the disc drive 100.

Figure 2:
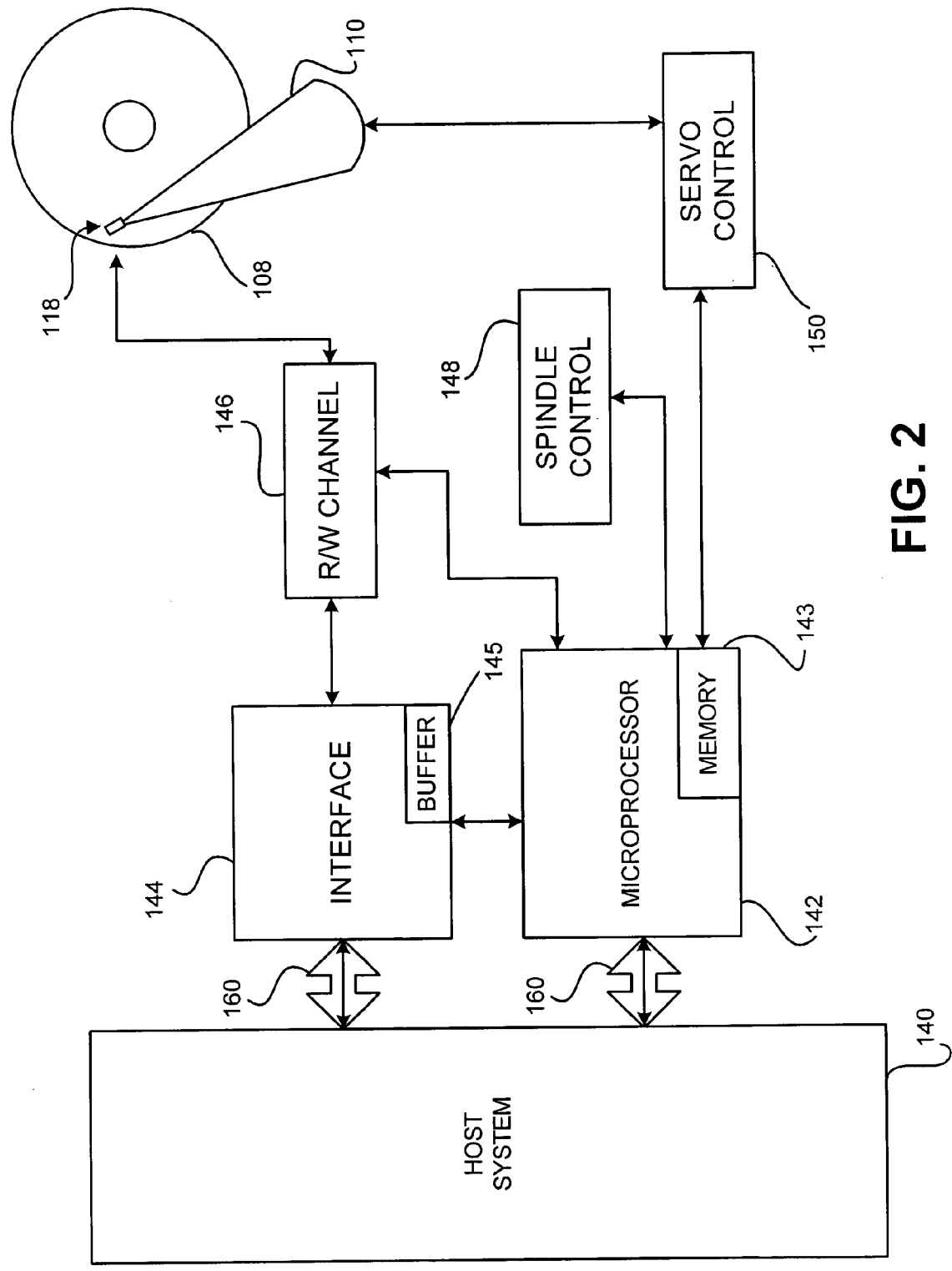
FIG. 2 is a functional block diagram generally showing a variety of functional components used to control the disc drive of FIG. 1.

Referring now to FIG. 2, shown therein is a functional block diagram of the disc drive 100 of FIG. 1 generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. Specifically, the disc drive 100 communicates with the host computer 140 using a bus 160. A bus is generally defined as a path carrying data between two or more devices. The bus 160 used to communicate data and control lines between the host computer 140 and the disc drive 100 is shown in dashed arrows because the bus 160 is not in and of itself a single physical object, but rather a collection of cabling/wiring that, taken together, make up a communication channel between the host computer 140 and the disc drive 100. As such, the bus 160 carries the cables/wires used to transfer data between a disc drive interface 144 and the host computer 140 as well as the cables/wires used to transfer data between the microprocessor 142 and the host computer 140.

The MEM 143 can include random access memory (RAM), read only memory (ROM), and other sources of resident memory for the microprocessor 142. The discs 108 are rotated at a constant high speed by a spindle control circuit 148. The radial position of the heads 118 is controlled through the application of current to a coil in the actuator assembly 110. A servo control system 150 provides such control.

Data is transferred between the host computer 140 and the disc drive 100 by way of the disc drive interface 144, which includes a buffer 145 to facilitate high speed data transfer between the host computer 140 and the disc drive 100. In order to illustrate embodiments of the present invention, the buffer 145 is referred to herein as a first level (L1) of cache memory (hereinafter, "L1 cache"). As such, the "L1 cache" 145 is used by the disc drive 100 to efficiently receive data from and provide data to both the host system 140 and the disc drive 100. In an embodiment, the L1 cache 145 is constructed from solid-state components. While the L1 cache memory 145 is depicted in FIG. 2 as being physically co-located with the interface 144, one skilled in the art should appreciate that the L1 cache 145 may be electrically connected, yet physically separated from the interface 144.

Data to be written to the disc drive 100 are passed from the host computer 140 to the L1 cache 145 and then to a read/write channel 146, which encodes and serializes the data and provides the requisite write current signals to the heads 118. To retrieve data that have been previously stored by the disc drive 100, read signals are generated by the heads 118 and provided to the read/write channel 146. The interface 144 performs read signal decoding, error detection, and error correction operations. The interface 144 then outputs the retrieved data to the L1 cache 145 for subsequent transfer to the host computer 140.

Figure 3:
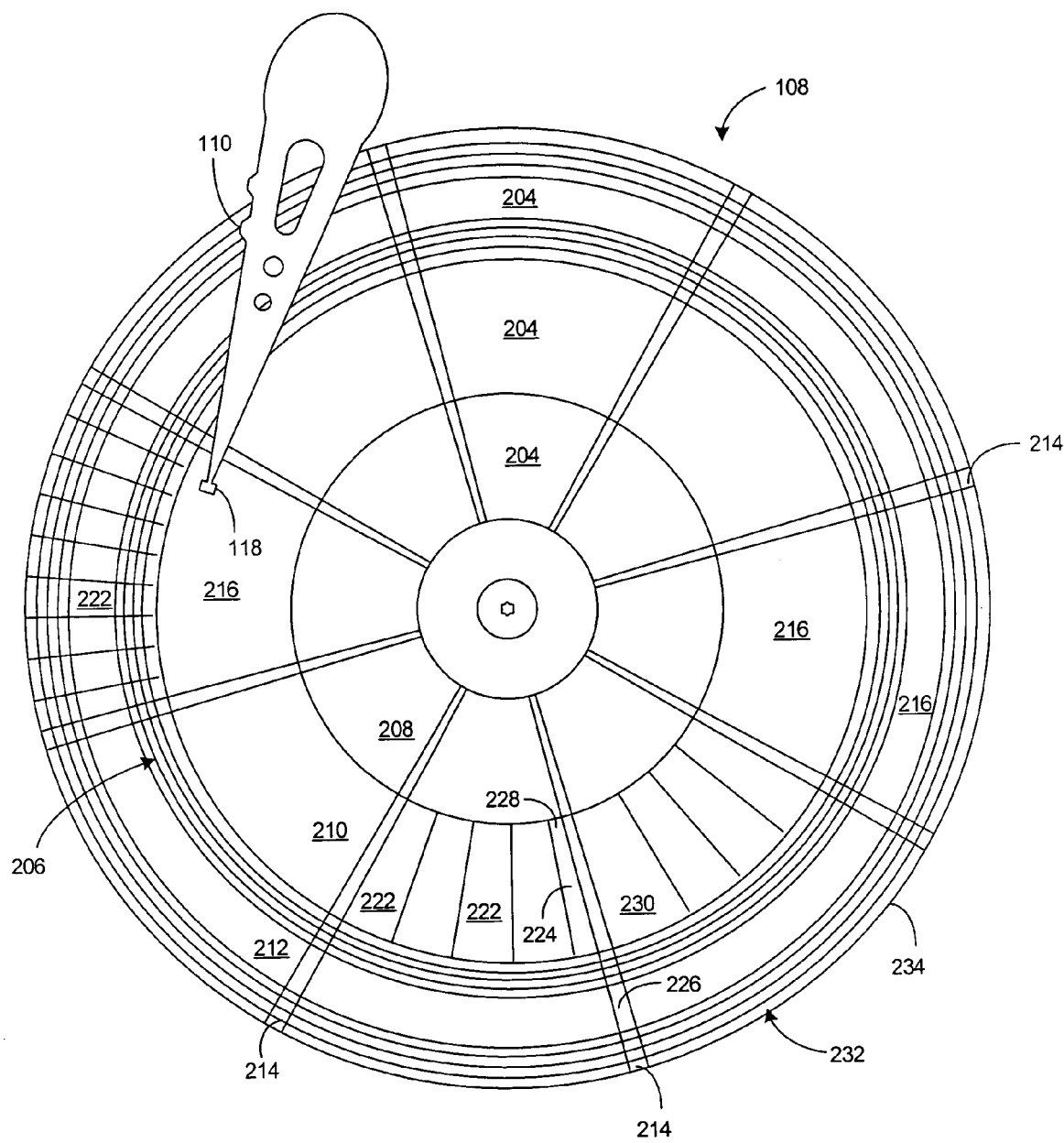
FIG. 3 shows the logical recording structure having a plurality of sectors for storing data in accordance with an embodiment of the present invention.

FIG. 3 shows the logical recording structure of an exemplary data disc 108 in accordance with an embodiment of the present invention. The disc 108 is divided into several concentric disc zones 204 which contain regions of adjacent tracks 206. For example, the magnetic disc 108 of FIG. 3 includes an inner zone 208, a center zone 210, and an outer zone 212. When configured with radial servo burst sectors 214, each disc track 206 is divided into slices called data wedges 216 between the burst sectors 214. The burst sectors 214 include data for maintaining accurate positioning of the data head 118 over a track 206 and are positioned at predetermined spaced locations around the disc 108.

As the disc 108 rotates, the data head 118 reads the servo information containing an address within the servo bursts 214 and sends the servo information back to the servo control system 150. The servo control system 150 checks whether the address in the servo information read from the burst sectors 214 corresponds to the desired head location. If the address does not correspond to the desired head location, the servo control system 150 adjusts the position of the head 118 to the correct track location.

Each track 206 includes discrete data sectors 222 containing stored user information. The number of data sectors 222 contained on a particular track 206 depends, in part, on the length (i.e. circumference) of the track 206. Therefore, tracks 206 located at the outer zone 212 typically contain more data sectors 222 per data wedge 216 than tracks 206 located at the center zone 210. Similarly, tracks 206 located at the center zone 210 typically contain more data sectors 222 per data wedge 216 than tracks 206 located at the inner zone 208. Besides containing user information, each data sector 222 also includes other data to help identify and process the user information.

In accordance with an embodiment of the present invention, a portion of the disc 108 is reserved for use as a second level of cache memory (hereafter, "L2 cache") 232. This L2 cache memory 232 is shown in FIG. 3 as being a circumferential grouping of tracks 206 located proximate to the outer diameter 234 of the disc 108. The L2 cache portion 232 shown in FIG. 3 is exemplary and it should be apparent to those skilled in the art that this portion 232 may include any number of tracks 206 and also may be on any region (circumferential or radial) of the disc 108.

The disc drive 100 uses the L2 cache 232 in conjunction with the L1 cache 145 in order to manage the data as the data is being transferred to and from its intended destination track 206 on the disc 108. Because the L2 cache 232 is located on non-volatile magnetic media (i.e., the disc 108), the L2 cache 232 generally has a slower access time than the L1 cache 145. However, the L2 cache 232 has the advantage of larger storage and a less expensive cost per unit of storage than the L1 cache 145. As such, in an embodiment of the present invention, the disc drive 100 manages the caching of data using each of the L1 cache 145 and the L2 cache 232 based on the access time of each and the available capacity of each. Furthermore, in an embodiment, it is worth noting that the sector data within the L2 cache region 232 is not directly accessible or visible to the host system 140.

Figures 1, 4:
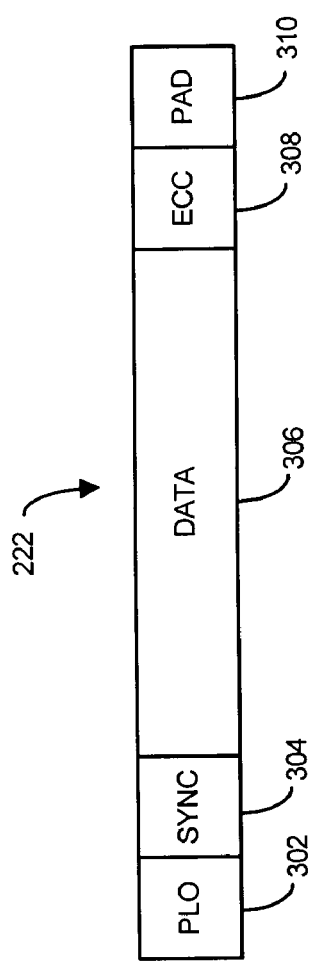
Figures 2, 4:
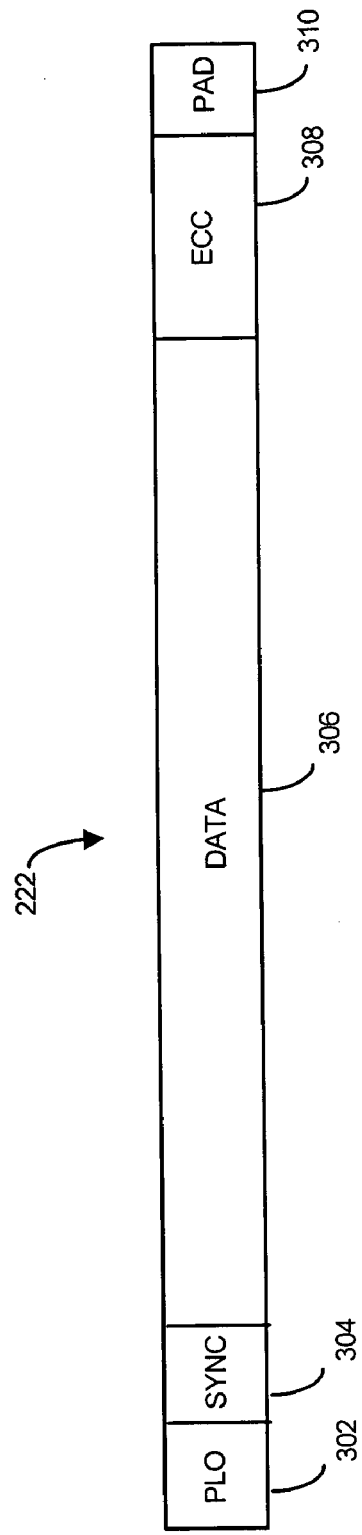

FIGS. 4-1 through 4-4 depict a representation of an exemplary data sector 222 in accordance with an embodiment of the present invention. Although the logical structures shown in FIGS. 4-1 through 4-4 are described in detail below as representing data sectors 222 located on the L2 cache portion 232 of the disc 108, those of skill in the art will appreciate that the exemplary design in these figures applies to all data sectors 222, regardless of the region on which the sector 222 is located. The data sector 222 includes a phase locked oscillator (PLO) field 302, a synchronization (SYNC) field 304, a user data region 306, an error correction code (ECC) field 308, and a pad field 310, which is a portion of the sector 222 that is neither read from nor written to by the disc drive 100, thereby forming a small buffer space between sectors 222.

In general, each of the data sector fields is fixed in length. The read/write channel 146 uses the PLO field 302 and the SYNC field 304 to measure the speed of the disc 108 and to accurately determine the rotational position the head 118. The user data region 306 contains user information which has been sent by the host system 140 to the disc 108 for storage thereon pursuant to the associated write command. The interface 144 uses the ECC field 308 to detect and correct errors in the data region 306. Data sectors 222 with fixed length fields may be required to split across servo bursts 214 when an integer number of data sectors 222 cannot fit within a data wedge 214. Referring back to FIG. 3, for example, data sector 224 is shown split across servo burst 226, dividing data sector 224 into two separate sections 228 and 230. Typically, when a data sector split occurs, the PLO field 302, the SYNC field 304, and the pad field 310 are repeated in the second section of the split data sector (not shown).

In accordance with the embodiment shown in FIG. 4-1, the size of the sector 222 is 512 bytes. In accordance with the embodiment shown in FIG. 4-2, the size of the data sector 222 is greater than 512 bytes. FIGS. 4-3 and 4-4 further illustrate the sector 222 shown in FIG. 4-2, in accordance with various embodiments of this invention. In the embodiment of FIG. 4-3, the data region 306 is divided into a first portion 305 and a second portion 307. The first portion 305 is sized and used for storing data received in one or more packets issued by the host computer 140. The second portion 307 is a data pad of arbitrary bit pattern for effectively filling the remainder of the data region 306 with undefined data (i.e., data that will not be sent to the host computer 140 in compliance with a read command). In accordance with an embodiment of the present invention, the sector shown in FIG. 4-3 is 1024 bytes in length and the first portion 305 is sized to store data from a single 512 byte data packet. In the embodiment of the present invention of FIG. 4-4, the data region 306 is also divided into first (405) and second (407) portions; and, like the sector 222 shown in FIG. 4-3, the first portion 405 is sized and used for storing data received in one or more packets issued by the host computer 140. However, unlike the sector 222 of FIG. 4-3, the second portion 407 is also sized and used for storing data received in one or more packets rather than being reserved as a data pad of arbitrary bit pattern. In this embodiment, the sector 222 may be 1024 bytes in length, with both the first (405) and 10 second (407) portions being sized to store data from single 512 byte data packets.

Embodiments of the present invention may be computer-implemented as a computer-readable program storage device that tangibly embodies a program of instructions executable by a computer system for transferring data between a host system and a data storage device using multi-level caching schemes. As such, the logical operations of the various embodiments of the present invention may be implemented: (1) as a sequence of computer implemented acts or program modules running on a computing system, and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and in any combination thereof without deviating from the spirit and scope of the present invention as recited within the claims attached hereto.

To further illustrate the commission of data from a sending interface (e.g., the host computer 140) to a data storage disc 108, FIGS. 5-1 through 5-10 collectively illustrate a computer-implemented process for recording a stream of seven data packets to the disc 108 in accordance with an embodiment of the present invention. This process is generally described below as a series of operations, acts or processes performed by the disc drive 100 managing storage of data to the disc 108. It should be appreciated that any single or multiple components, either firmware or hardware, of the drive 100 may be used to perform these operations, acts or processes. More detailed explanations of the inter-related flow of these operations, acts or processes within a flow diagram context is provided below in FIGS. 6–10.

Figures 1, 5:
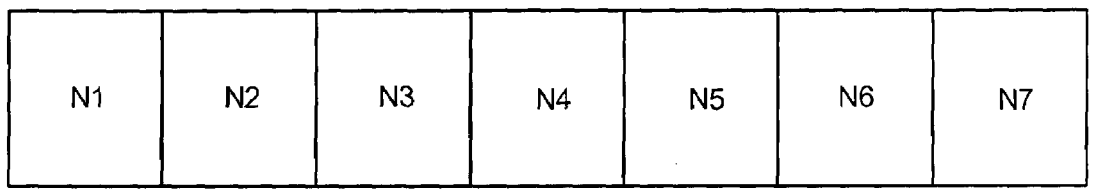
Figures 2, 5:
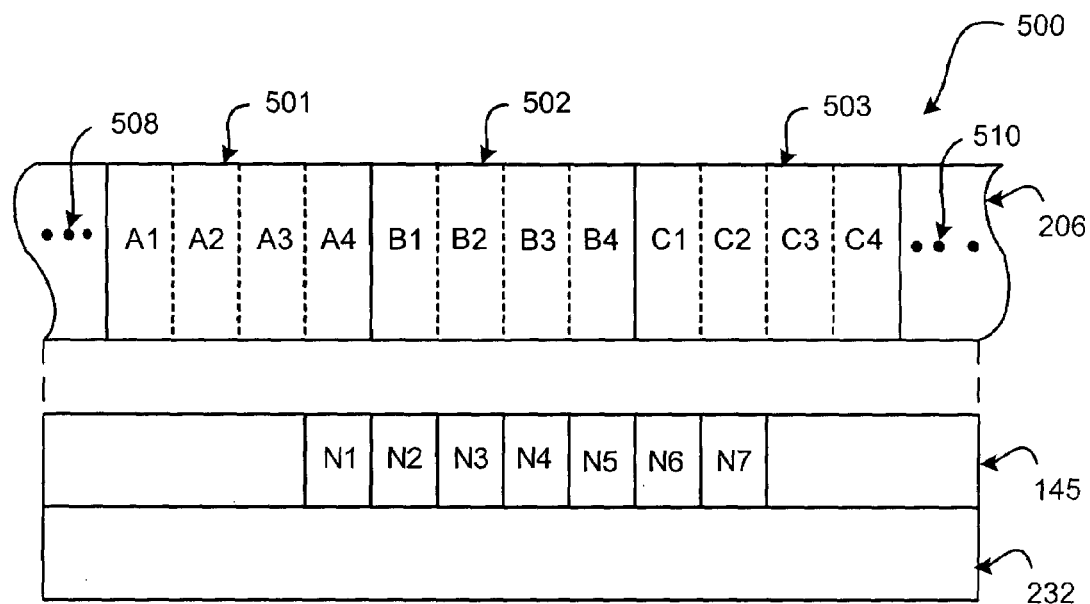
Figures 3, 5:
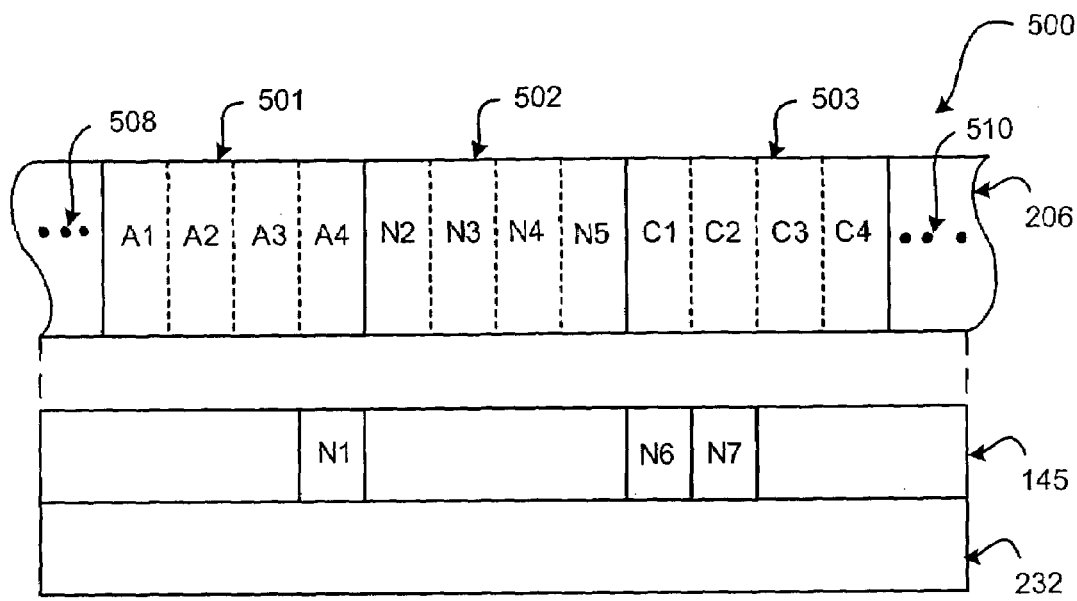
Figures 4, 5:
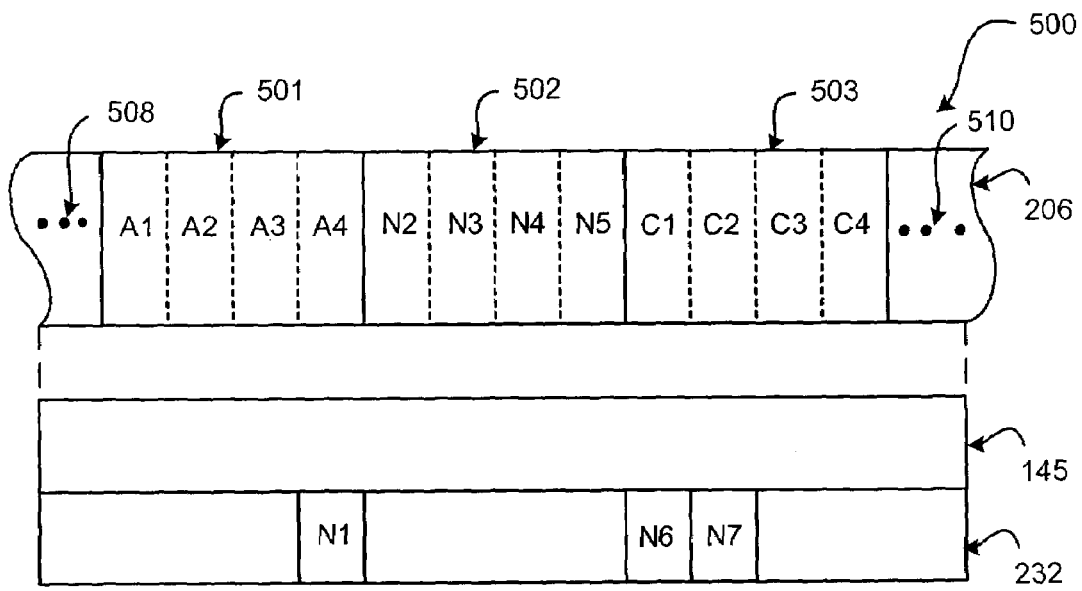
Figure 5:
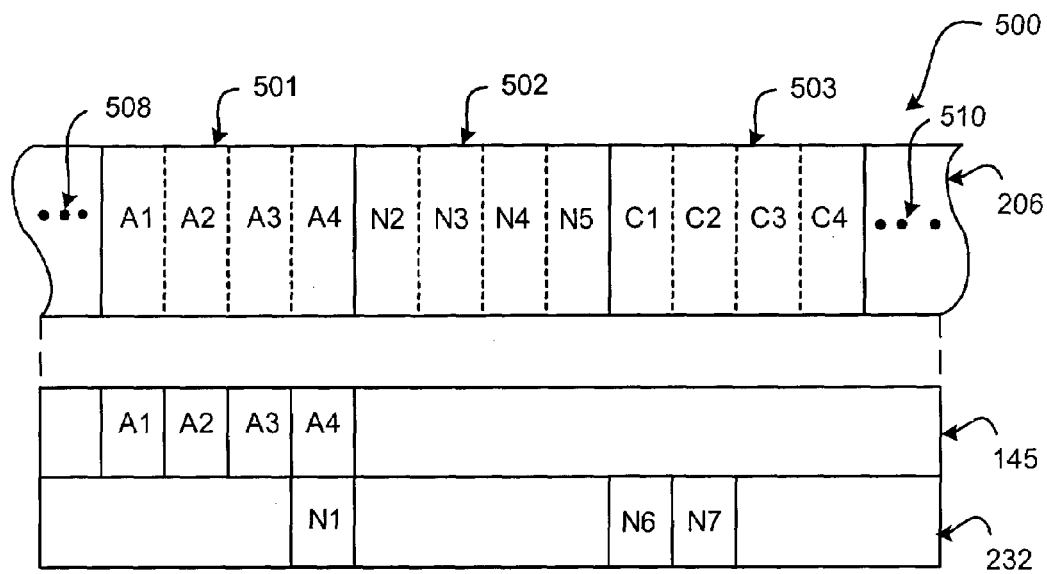

The seven data packets included within the stream sent from the sending interface are shown in FIG. 5-1 as data packets N1, N2, N3, N4, N5, N6, and N7. FIGS. 5-2 through 5-10 illustrate a logical representation of a multi-tier caching structure 500 used to effectuate the storage of these packets N1, N2, N3, N4, N5, N6, and N7 to a disc 108 in a disc drive 100. More particularly, FIGS. 5-2 through 5-10, illustrate through logical representations the following three separate storing/caching areas making up the multi-tier caching structure 500 of the disc drive 100: a track 206 on the disc 108, the L1 cache 145, and the L2 cache 232. In the embodiment described by the illustrations of FIGS. 5-1 through 5-10, the packets N1, N2, N3, N4, N5, N6, and N7 are all destined for a single track 206 on the disc 108 for illustrative purposes. It is equally contemplated that these packets N1, N2, N3, N4, N5, N6, and N7, or any sequence of packets for that matter, may instead be destined, and therefore recorded to, more than one track 206 on the disc 108.

The track 206 includes a plurality of sectors 222, of which only a logical representation of a first exemplary sector 501, a second exemplary sector 502 and a third exemplary sector 503 are shown in FIGS. 5-2 through 5-10. These sector 501, 502 and 503 are the primary storage locations on the disc 108 for the data packet N1, N2, N3, N4, N5, N6 and N7, as specified by the host computer 140 in the write command. For purposes of this example, the logical representations of the first sector 501, the second sector 502 and the third sector 503 represent contiguous sectors 222 on the track 206. Other sectors 222 exist on the track 206 and may be located both prior to and after the three contiguous exemplary sectors 501, 502 and 503, as depicted by the repetition dots 508 and 510.

The L1 cache 145 and L2 cache 232 may take on any structure known to those of skill in the art for caching data, for example, in an embodiment, data packets are stored in these cache memories in cache, or buffer, sectors (not shown). In this embodiment, the sectors of the L1 cache 145 are sized to hold only a single data packet sent from the host computer 140. In contrast, the sectors of the L2 cache 232 are sized to hold one or more data packets send from the host computer 140, by way of the L1 cache 145. Thus, whereas the sectors of the L1 cache 145 are operable to hold one packet each, the sectors of the L2 cache 232 are operable to hold "n" data packets each, where "n" is preferably an integer number of data packets. These sectors may be of any length, but to illustrate FIGS. 5-2 through 5-10, these sectors are substantially equal in length to the exemplary data packets N1, N2, N3, N4, N5, N6, and N7.

Initially, and in accordance with an exemplary embodiment only, data which had been previously written to the disc 108 is stored on the three contiguous sectors 501, 502 and 503, which are each 2048 bytes in length, and thus, operable to each store four standard 512 byte packets issued from a sending interface (e.g., host computer 140) to the disc drive 100. As such, the first sector 501 initially holds four 512 byte entries of data (e.g., packets): A1, A2, A3, and A4; the second sector 502 initially holds four 512 byte entries of data (e.g., packets): B1, B2, B3, and B4; and the third sector 503 initially holds four 512 byte entries of data (e.g., packets): C1, C2, C3, and C4. Each of the regions of the sectors 501, 502 and 503 storing these entries of data (A1–A4, B1–B4 and C1–C4, respectively) are shown divided by dashed lines in FIGS. 5-2 through 5-10.

FIGS. 5-2 through 5-10 are described below using an example that illustrates processes of an embodiment of the present invention wherein the sending interface (e.g., host system 140) issues a write command requesting that data packets N1, N2, N3, N4, N5, N6, and N7 are stored as follows: (a) packet N1 is to be written over data entry A4 stored on the first sector 501; (b) packets N2, N3, N4 and N5 are to be written over all data entries (B1, B2, B3 and B4) stored on second sector 502; and (c) packets N6 and N7 are to be written over data entries C1 and C2 stored on the third sector 503.

For purposes of illustration, indication of destination between any of the track 206, the L1 cache 145, and the L2 cache 232 is shown with vertical alignment of data. That is, data will be copied or moved up and down vertical columns as it is manipulated. This is for purposes of illustration. One skilled in the art should appreciate that there are well-established mechanisms for recording sector addresses to which cached data is to be written.

Referring first to FIG. 5-2, the track 206 is shown initially storing data packets A1–A4, B1–B4 and C1–C4; the L1 cache 145 is shown initially storing the stream of data packets N1–N7; and the L2 cache 232 is shown initially empty. As such, this example assumes that the sending interface, e.g., the host computer 140 in the described embodiment, and both the L1 (145) and the L2 (232) cache have all been initialized and the described data packets N1–N7 are the only packets that the host computer 140 has issued during this initial communication session with the disc drive 100. After the data packets N1–N7 have been received by the disc drive 100, the drive 100 sends the packets to the L1 cache 145 as shown.

Now referring to FIG. 5-3, the disc drive 100 overwrites data entries B1, B2, B3 and B4 stored on the second sector 502 with data packets N2, N3, N4 and N5, respectively. As described in further detail below in connection with FIG. 10, the data packets N2, N3, N4 and N5 are considered to be "aligned" for storage in the second sector 502; and therefore, are operable for storage thereon without first having to be cached in the L2 cache 232. In an embodiment, upon detection of "aligned" data packets (e.g., N2, N3, N4 and N5) within a stream of packets being received from the host computer 140, the disc drive 100 first records these "aligned" packets N2, N3, N4 and N5 to the track 206 prior to initiating storage of "non-aligned" packets (e.g., N1, N6 and N7) to the track 206.

After the "aligned" packets N2, N3, N4 and N5 are committed to appropriate sector(s) on the track 206, the disc drive 100 begins initiation of a process for recording the "non-aligned" packets N1, N6 and N7 to the appropriate sector(s) on the track 206. In accordance with an embodiment described in more detail with FIG. 8, this process is referred to herein as a "read-modify-write" process. The read-modify-write process is performed for each one or more "non-aligned" packets (i.e., packet N1 and packets N6/N7) that is/are to be committed to a single sector (i.e., the first sector 501 and the second sector 502, respectively) on the track 206. But first, the disc drive 100 moves each of these "non-aligned" packets N1, N6 and N7 from the L1 cache 145 to the L2 cache, the results of which are illustrated in FIG. 5-4.

Figures 5, 6:
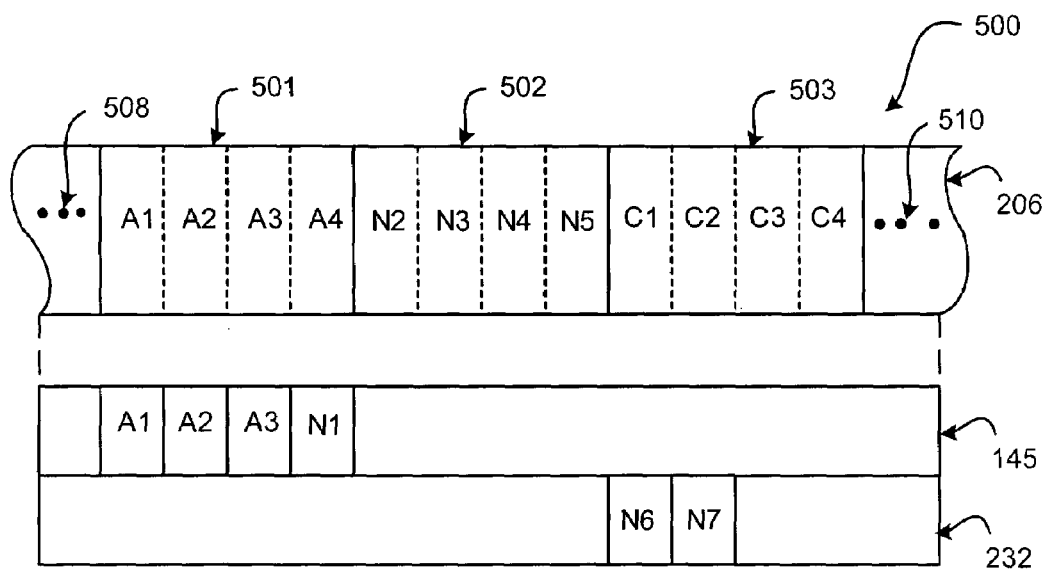

Next, disc drive 100 begins the read-modify-write process for data packet N1 by copying all data entries (A1–A4) from the first sector 501 and storing the entry copies A1, A2, A3 and A4 in the L1 cache 145. The result of this process is illustrated in FIG. 5-5, and encompasses the "read" aspects of the read-modify-write process. Subsequently thereafter, and as part of the "modify" aspects of the read-modify-write process, the disc drive 100 moves the data packet N1, which is currently stored in the L2 cache 232, back to the L1 cache 145, and more particularly, to the L1 cache sector currently holding the data entry A1, thereby overwriting data entry A1 with data packet N1. In accordance with the embodiment described herein, the data entries A1, A2 and A3 are not affected or overwritten by the modification to the L1 sector cache holding entry A4; hence, the reference of this process to a "modification" act. FIG. 5-6 illustrates the results of this "modification" process.

After modifying the cached data retrieved from the first sector 501, the disc drive 100 proceeds to transfer the modified data from the L1 cache 145 to the first sector 201, thereby completing the commission of data packet N1 to the track 206. The results of this particular process, which encompasses the "write" aspects of the read-modify-write process, is shown in FIG. 5-6. At this point in time, the disc drive 100 continues with the commission of the entire data packet stream to the track 206 by performing the read-modify-write process on the two data packets N6 and N7 remaining in the L2 cache 232, the results of which are illustrated in sequence by FIGS. 5-8 through 5-10.

Referring now to FIG. 6, a process 600 for storing (hereinafter, "storage process") data to a data storage device utilizing multi-level caching is shown in accordance with an embodiment of the present invention. The data stored to the data storage device by the storage process 600 is received by the device pursuant to a write command issued by a sending interface 140 to the device. In the embodiment of FIG. 6, the sending interface is the host system 140. In accordance with an alternative embodiment, the sending interface is a relay mechanism that transmits data to the disc drive 100 on behalf of the host system 140. Further, according to another embodiment of the present invention, the specified data storage device is a disc drive 100 and the write command requests that data are written to storage locations (i.e., sectors 222) on a disc 108 of the drive 108.

In accordance with embodiments of the present invention, the storage process 600 employs two or more levels of intermediate caching in the commission of the data to the specified sectors 222 on disc 108. For illustrative purposes, the storage process 600 is only described below as storing a single transmission of data to one or more specified sectors 222 on the disc 108. It should be appreciated, however, that the storage process 600 may be implemented or performed multiple times, sequentially or simultaneously, to store multiple transmissions of data.

In an embodiment of the present invention, the storage process 600 is performed, by a flow of operations ("operation flow") beginning with a start operation 602 and ending with an end operation 614. The start operation 602, and thus the operation flow for the storage process 600, is initiated upon receipt by the disc drive 100 of the write command issued by the host system 140. From the start operation 602, the operation flow passes to a receive operation 604. The receive operation 604 receives the data associated with the write command and stores the received data to the L1 cache 145. After the data has been stored to the L1 cache 145, the operation flow passes to an acknowledge operation 608. The acknowledge operation 608 acknowledges to the sending interface (e.g., the host system 140) that the write command is complete. The operation flow then passes from the acknowledge operation 608 to a transfer operation 610.

The transfer operation 610 transfers the data from the L1 cache 145 to L2 cache 232. In an embodiment of the present invention, this transfer occurs after the used capacity of the L1 145 cache exceeds a given threshold, triggering a transfer of data from the L1 cache 145 to the L2 cache 232 in order to make additional L1 cache storage capacity available for subsequent incoming write commands. In another embodiment of the present invention, the transfer operation 610 waits for the disc drive 100 to be in an idle state. An idle state occurs when the host system 140 is neither reading data from nor writing data to the disc drive 100. In accordance with this embodiment, the transfer operation 610 transfers the data from the L1 cache to the L2 cache after an idle state is reached. One skilled in the art should appreciate that other triggers and algorithms for use by the transfer operation 610 are also within the scope of the present invention.

Following the transfer operation 610, the operation flow passes to a write operation 612. The write operation 612 writes the data stored in the L2 cache 232 to the specified sectors 222 on the disc 108. In accordance with another embodiment of the present invention, the write operation 612 occurs after the used capacity of the L2 cache exceeds a given threshold, triggering a transfer of data from the L2 cache to the specified sectors 222 locations in order to make additional storage capacity in the L2 cache available for incoming write commands. In accordance with yet another embodiment of the present invention, the write operation 612 waits for the disc drive 100 to be in an idle state. In this embodiment, after an idle state is reached, the write operation 612 writes the data stored in the L2 cache to the specified sectors 222. From the write operation 612, the operation flow concludes at the end operation 614.

Figures 5, 6, 7:
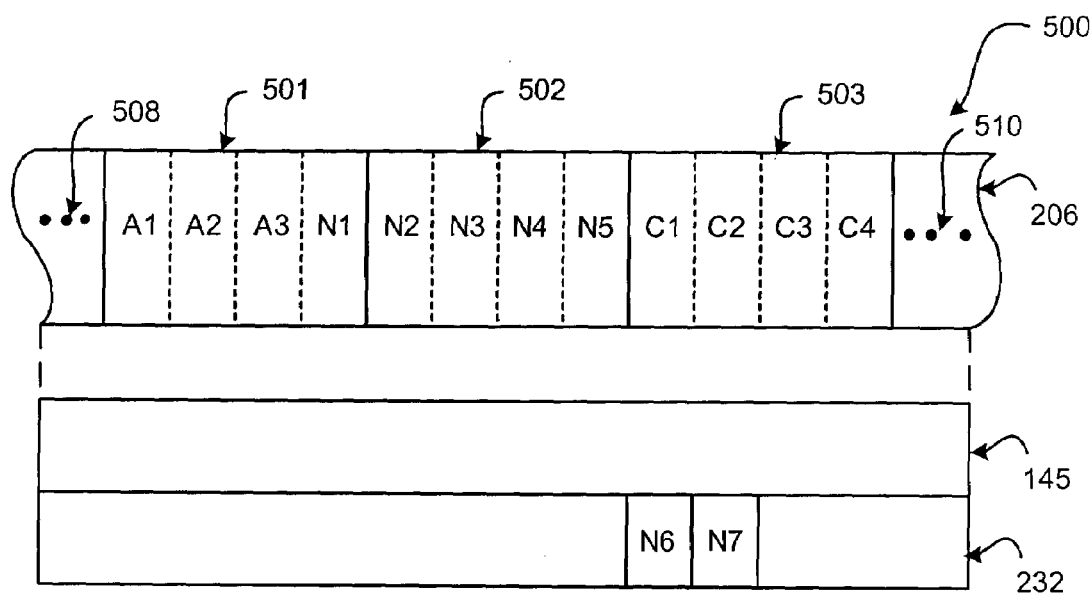

FIG. 7 depicts a logical scheme illustrating operational characteristics of the storage process 600 in accordance with an embodiment of the present invention. In this embodiment, the peripheral tracks of the disc 108 are used as the L2 cache 232 buffer. The scheme is initiated, as shown in the start operation 602 of the storage process 600, by the reception of a write command. The write command is depicted graphically in FIG. 7 by reference numeral 702. As described above, the write command 702 is accompanied by data 703 that the sending interface (e.g. host computer 140) is requesting that the disc drive 100 save to one or more specified sector(s) on the disc 108. Identification of these specified sectors 222 are included in the write command 702.

Initially, the write command 702 and the associated data 703 are entered into the L1 cache 145, as depicted in the store operation 606 of the storage process 600. In an embodiment of the present invention, the L1 cache 145 is volatile memory, meaning that cached data stored therein would be lost in the event of a loss of power to the L1 cache 145. At the time that the data 703 is entered into the L1 cache 145, the write operation 606 also updates an L1 cache table 704 in order to keep track of the identity of the data 703 in the L1 cache 145. This table 704 also tracks the identification of the intended destination location on the disc 108, i.e., the sectors 222 onto which the data 703 are to be recorded.

The table 704 may be stored in the L1 cache 145, or alternatively may be stored in another memory unit within the disc drive 100.

In accordance with embodiments of the present invention, data 703 is recorded not only to the L1 cache 145 (as described in the proceeding paragraph), but also to the L2 cache 232 prior to being committed to its ultimate destination (i.e., a specified sector 222). Thus, after the data 703 has been entered into the L1 cache 145, the data 703 is ready for transfer to the L2 cache 232, as depicted in operation 610 of the storage process 600. The peripheral tracks used for the L2 cache 232 in FIG. 7 are susceptible of relatively fast recording rates, because of their capacity to contain more data. However, as noted above, other locations for the L2 cache 232 are also contemplated within the scope of the present invention. For example, the L2 cache 232 may be on any other region on the disc 108, or alternatively, the L2 cache 232 may be solid state, nonvolatile memory.

As was the case with entry of data into the L1 cache 145, entry of data into the L2 cache 232 requires update of an L2 cache table 708. In an embodiment, the L2 cache table 708 is stored in a writeable non-volatile memory device, such as, without limitation, a flash memory device, an MRAM device, an FRAM device, or upon an area of the disc 108 itself. The L2 cache table 708 is responsible for keeping track of the identity of the data entered in the L2 cache 232, including the identification of the location where the data is to be ultimately recorded on the disc 100. After entering the data 703 into the L2 cache 232, this data 703 is ready for transfer to the intended storage location on the disc 108 (i.e., specified sector location 222), as depicted in operation 612 of the storage process 600.

Figures 5, 6, 7, 8:
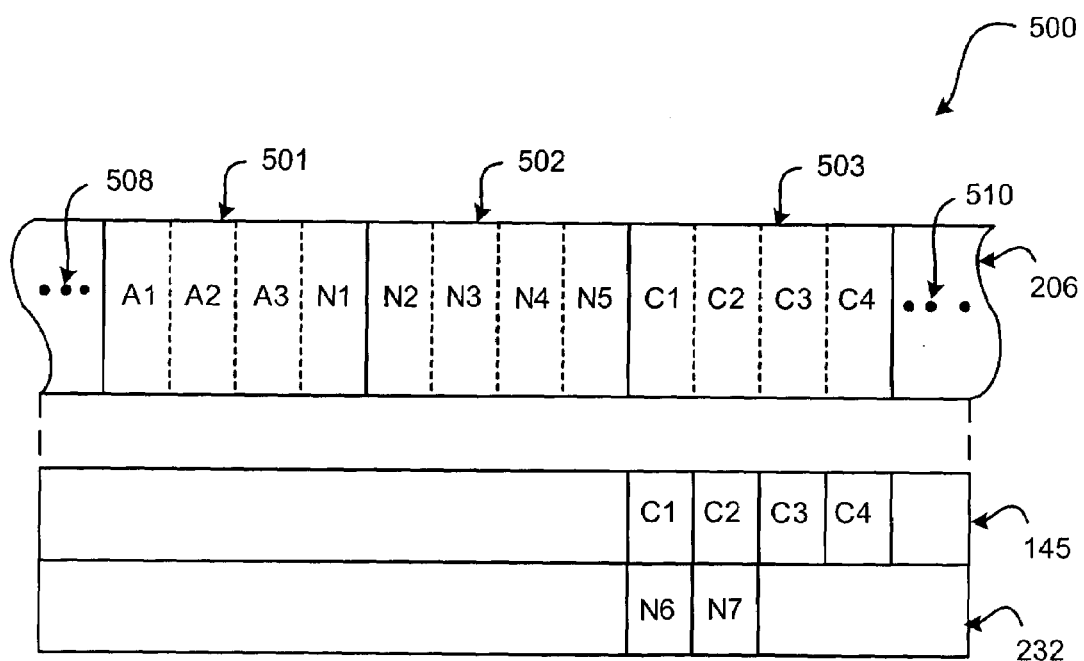

Referring now to FIG. 8, process 800 for writing data cached in the L2 cache 232 to the specified sector(s) 222 on the disc 108 is shown in accordance with an embodiment of the present invention. As such, the process 800 is an embodiment of the write operation 612 of the storage process 600. In this embodiment, the data region of the sector(s) 222 on the disc 108 to which data is being written are sized greater than 512 bytes. Thus, the process 800 writes data to these sector(s) 222 by first reading whatever data is currently stored on the sector(s) 222 into cache, modifying the current data with the data cached in the L2 cache 232 and then writing the modified data back to the sector(s) 222. For this reason, the process 800 is referred to herein as a "read-modify-write" process. A logical illustration of an embodiment of the read-modify-write process 800 is shown and described in connection with FIGS. 5-1 through 5-10, supra.

The read-modify-write process 800 may be utilized to store multiple data entries to multiple specified sectors 222 on a disc 108 of the disc drive 100. However, for illustrative purposes, and not by means of limitation, the read-modify-write process 800 is described below as writing data to a single disc sector 222. It should be appreciated that the read-write-modify process 800 may be implemented or performed multiple times, sequentially or simultaneously, to update multiple disc sectors with data cached in the L2 cache 232. In an embodiment of the present invention, the read-modify-write process 800 is performed by an operation flow beginning with a start operation 802 and ending with a terminate operation 812. The start operation 802 is initiated as the operation flow of the storage process 600 passes from the transfer operation 610 to the write operation 612. From the start operation 802, the operation flow passes to a select operation 804.

The select operation 804 selects an entry of data cached in the L2 cache 232 for transfer to a specified sector 222 on a disc 108 of the disc drive 100. In an embodiment of the present invention, the L2 cache 232 is located substantially at or near an outer diameter 234 of the disc 108. One skilled in the art should appreciate that the L2 cache 232 may reside on other locations on the disc 108 or even in the disc drive 100. In fact, the L2 cache 232 may be a reserved block of space in the L1 cache 145. Once the select operation 804 is complete, operation flow passes to a read operation 806.

The read operation 806 reads into cache the data currently stored on the sector onto which the data is to be recorded. The select operation 804 identifies the location (e.g. physical sector address) of this sectors by referencing the L2 cache table 708, where this information is linked to the selected data. In an embodiment of the present invention, the read operation 806 reads the current sector data into the L1 cache 145. Alternatively, the read operation 806 may read the current sector data into the L2 cache 232 directly or indirectly (e.g., a disc drive having multiple transducers 118 per disc surface) without first passing he data temporarily through the L1 cache 145.

After the data currently stored on the specified sector are read into cache, the operation flow passes from the read operation 806 to a modify operation 808. The modify operation 808 modifies the data read from the specified sector with the data from the L2 cache 232 by overwriting the appropriate portions of the retrieved sector data with the cached data. In an embodiment of the present invention, the data is copied from the L2 cache 232 to the L1 cache 145 in order to overwrite the copied sector data. The operation flow then passes from the modify operation 808 to a write operation 810. The write operation 810 writes the modified data from the cache (either L1 or L2) to the data region of the specified sector 222 on the disc 108. As noted above, the specified sector is identified based on the linking in the L2 cache table 708.

From the write operation 810, the operation flow of the read-modify-write operation 800 concludes at the terminate operation 812. Thus, in accordance with the embodiment shown in FIG. 8, the operation flow of the storage process 600 also concludes at the terminate operation 812.

Figures 5, 6, 7, 8, 9:
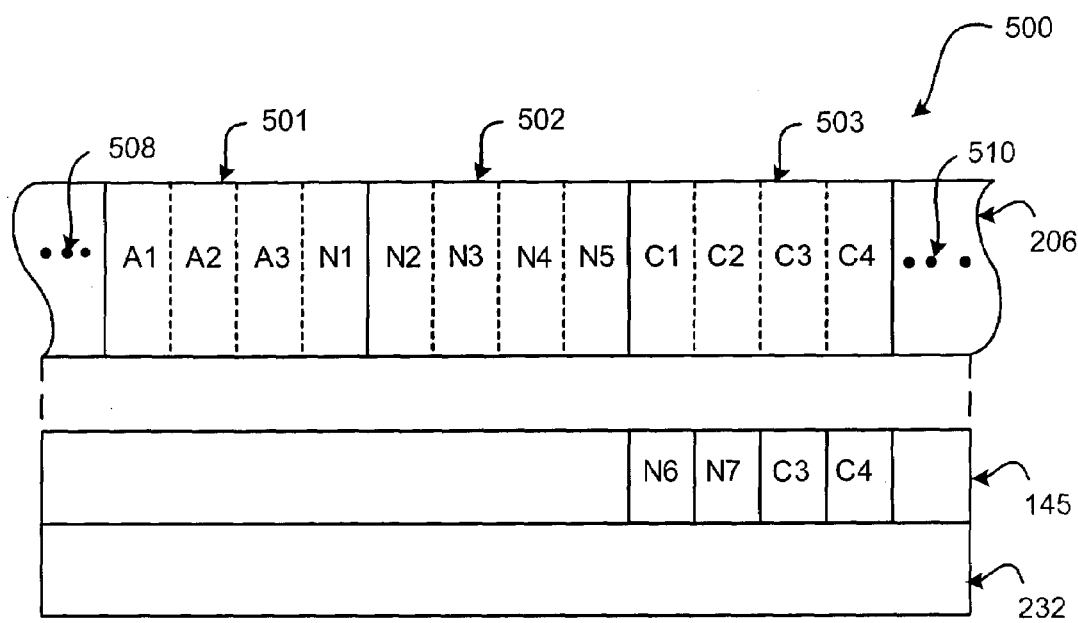

Referring now to FIG. 9, a process 900 for transferring (hereinafter, "transfer process") data between storage locations when a disc drive 100 is otherwise idle is shown in accordance with an embodiment of the present invention. The transfer process 900 may be utilized to perform multiple storage operations after an idle state is determined. Indeed, the transfer process 900 may be used to determine a time for transfer of data either from the L1 cache 145 to the L2 cache 232 or from the L2 cache 232 to the intended storage location 222 (e.g., sector(s) specified in the L2 cache table 708) on the disc 108. As such, operation of the transfer process 900 is intended to be an embodiment of both the transfer operation 610 and the write operation 612 of the storage process 600.

In an embodiment of the present invention, the transfer process 900 is performed by an operation flow beginning with a start operation 902 and ending with a terminate operation 908. Because the transfer process 900 may function as either the transfer operation 610 or the write operation 612, the start operation 902 may be initiated as the operation flow of the storage process 600 passes from either of these operations (610 and/or 612). It should be appreciated that the transfer process 900 may be implemented or performed multiple times, sequentially or simultaneously. However, for illustrative purposes, and not by means of limitation, only a single iteration of the transfer process 900 is shown in FIG. 9 and described below.

From the start operation 902, the operation flow passes to a query operation 904, which controls when data is transferred based on a determination on whether a predetermined threshold condition is met. Although various threshold conditions are contemplated within the scope of the present invention, the transfer process 900 is described below with the state (e.g., active or idle) of the disc drive 100 being the predetermined threshold condition. As such, the query operation 904 determines whether the disc drive 100 is idle.

In an embodiment, the disc drive 100 is considered to be in an "idle" state at times when the drive 100 is neither reading from or writing to the data storage disc 108. Such a determination may be made numerous ways, including, for instance, by querying the disc drive microprocessor 142, which in response to such a query responds that the drive 100 is either in an idle state or an active state. If the query operation 904 determines that the disc drive 100 is idle, the query operation 904 passes operation flow to a storage operation 906. Depending on the implementation of the transfer process 600 (i.e. either functioning as the transfer operation 610 or the write operation 612), the storage operation 906 either transfers (1) cached data from the L1 cache 145 to the L2 cache 232; or (2) data from the L2 cache 232 to the intended storage location (i.e., appropriate sector(s) 222) on the disc 108). In accordance with an embodiment, the storage operation 906 may function as both the transfer operation 710 and the write operation 712 substantially simultaneously. Once completed, the storage operation 906 passes the operation flow to the terminate operation 908, which terminates the transfer process 900.

If, however, the query operation 904 determines that the disc drive 100 is not idle, the operation flow remains at the query operation 904 until the disc drive 100 changes to an idle state. In accordance with another embodiment of the present invention, the threshold condition used by the query operation 904 is whether a determined percentage of the L1 cache 145 or the L2 cache 232, whichever is the relevant cache for purposes of this analysis, is currently being used. In this embodiment, the threshold condition is satisfied if usage of the relevant cache exceeds the determined percentage. Also, in accordance with another embodiment of the present invention, the threshold condition used by the query operation 904 is whether a determined percentage of the L1 cache 145 or the L2 cache 232, whichever is the relevant cache for purposes of this analysis, is currently available. In this embodiment, the threshold condition is satisfied if the available capacity of the relevant cache is less than the determined percentage. In accordance with yet another embodiment, the threshold condition is a flush command issued by the host computer 100 to the disc drive 100. Depending on the implementation of the transfer process 600 (i.e., either functioning as the transfer operation 610 or the write operation 612), the flush command may either instruct the drive 100 to transfer all data from the L1 cache 145 to the L2 cache 232 and/or all data from the L2 cache 232 to the appropriate sector(s) on the disc 108. In this embodiment, the query operation 904 queries to determine whether a flush command has been received from or on behalf of the host system 140. If a flush command has been received, the query operation 904 passes the operation flow to the storage operation 906. One skilled in the art should appreciate that threshold conditions in addition to those described above are within the scope of the present invention.

Figures 5, 6, 7, 8, 9, 10:
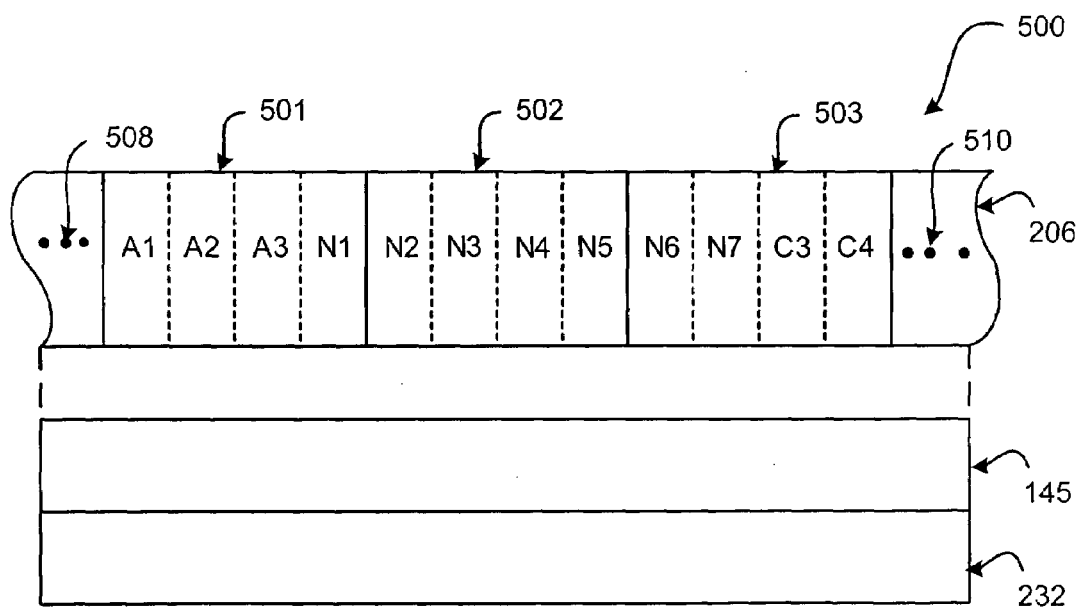
Figure 6:
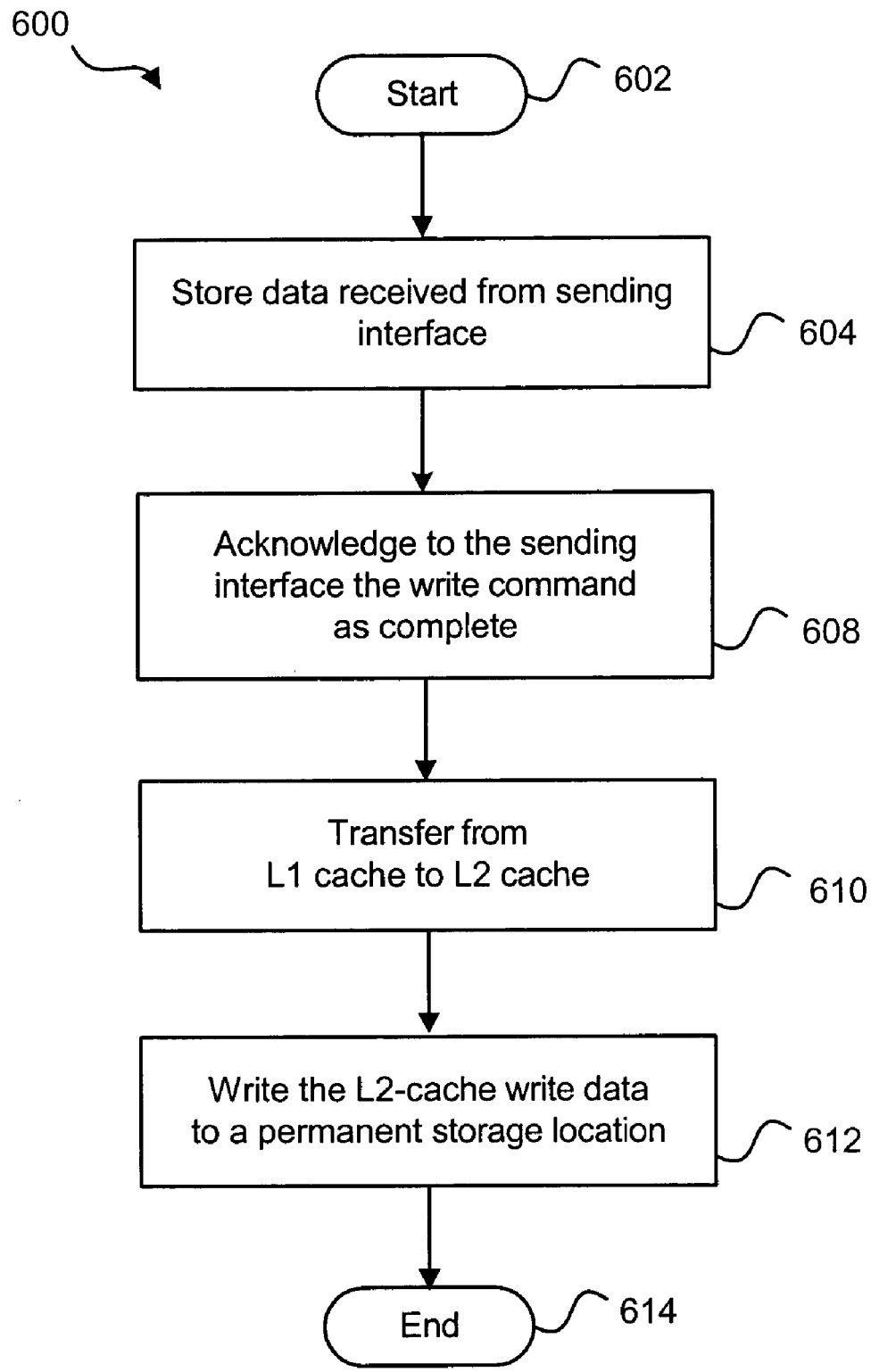
Figure 7:
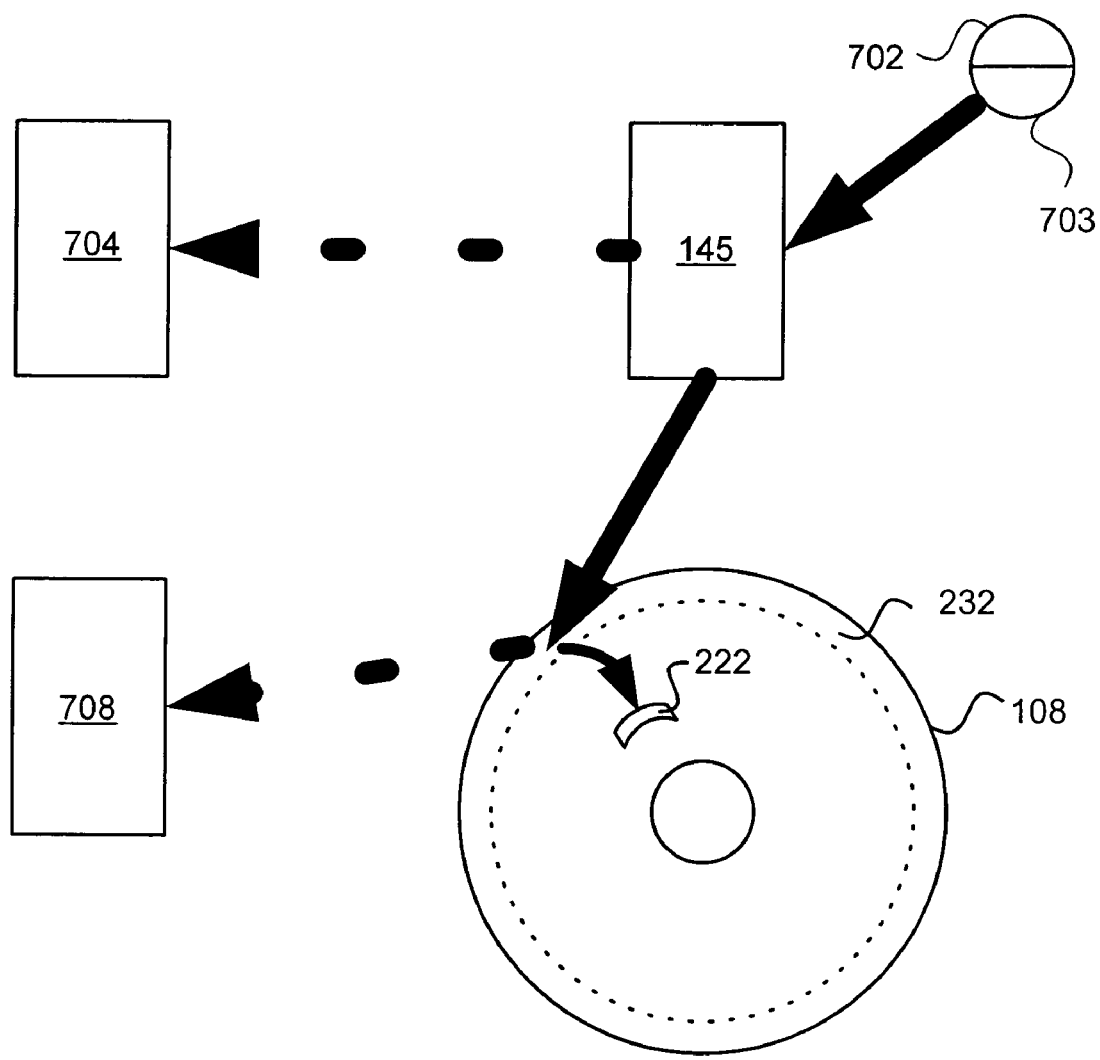
Figure 8:
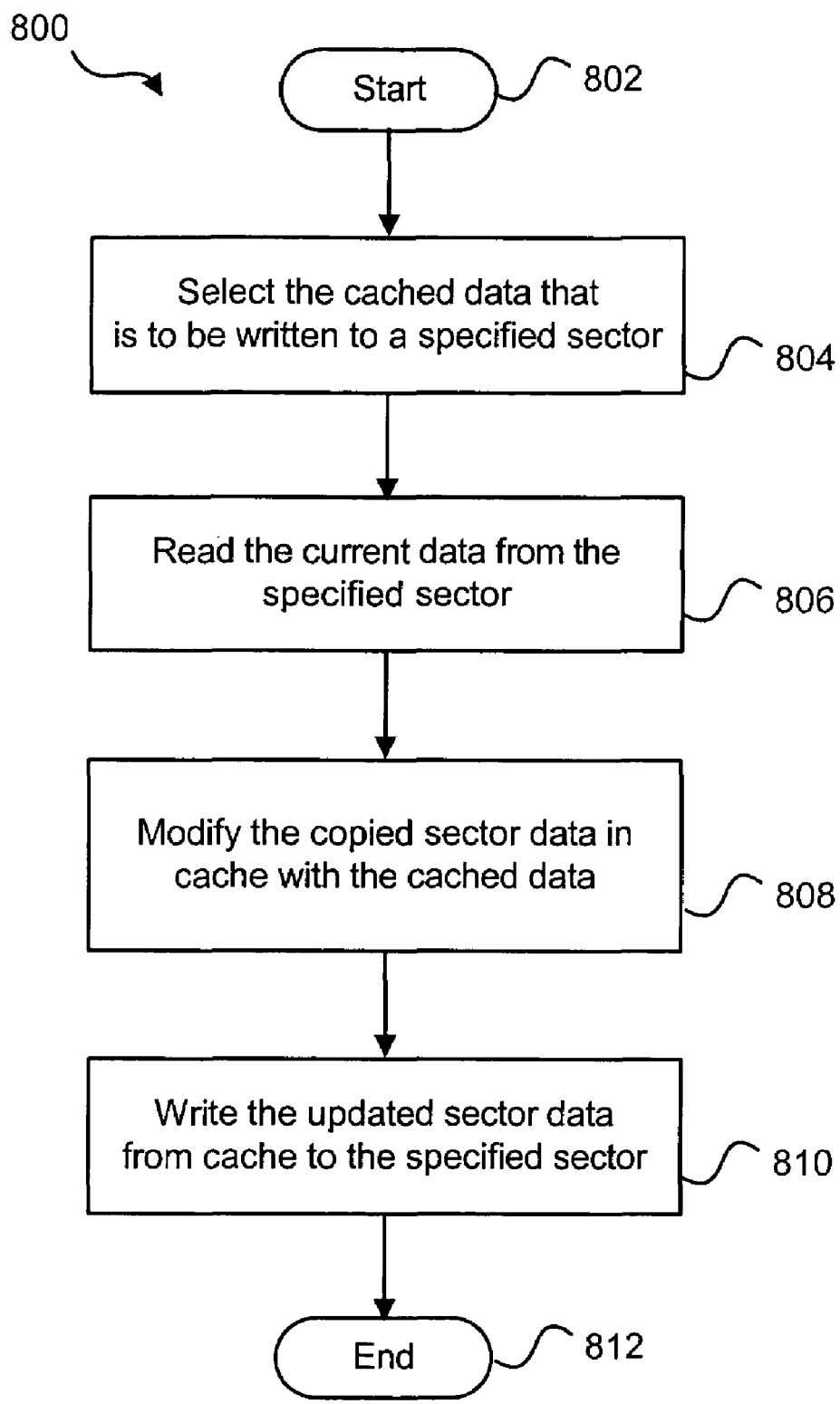
Figure 9:
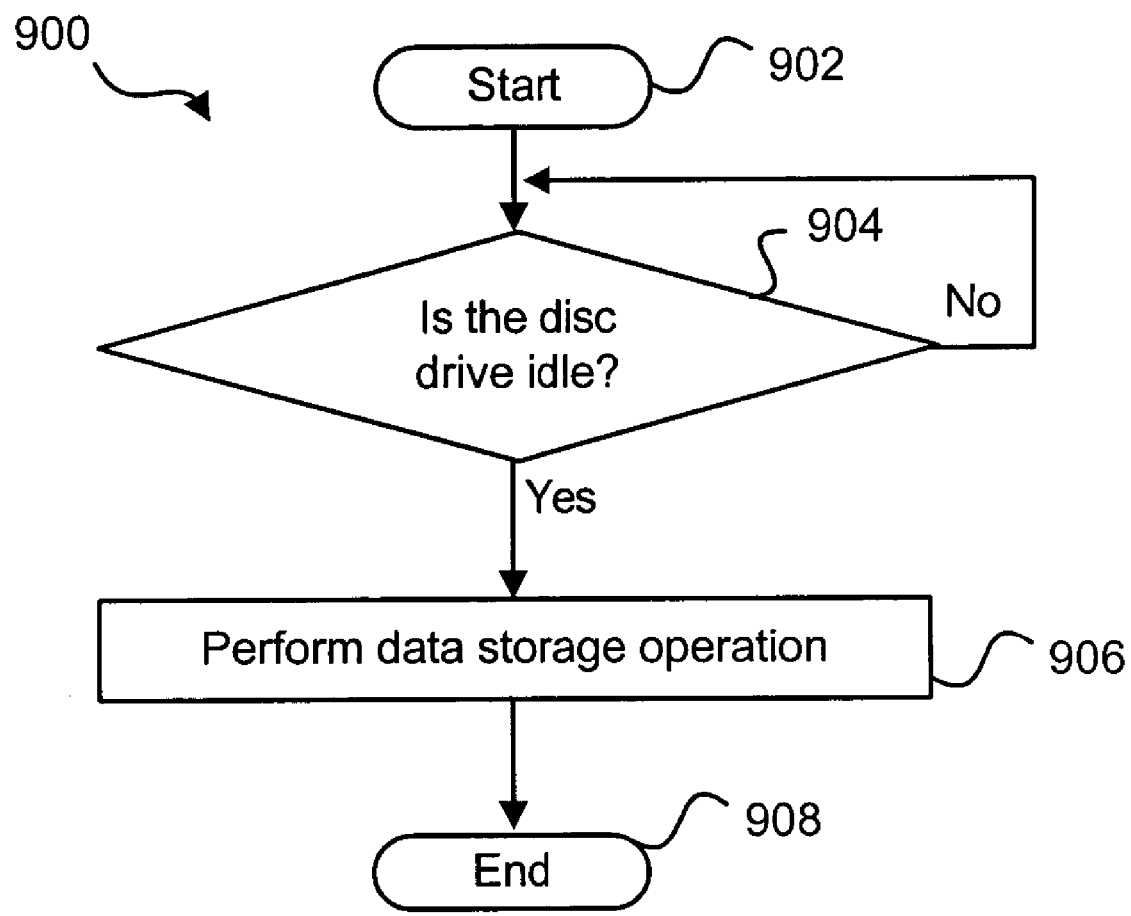
Figure 10:
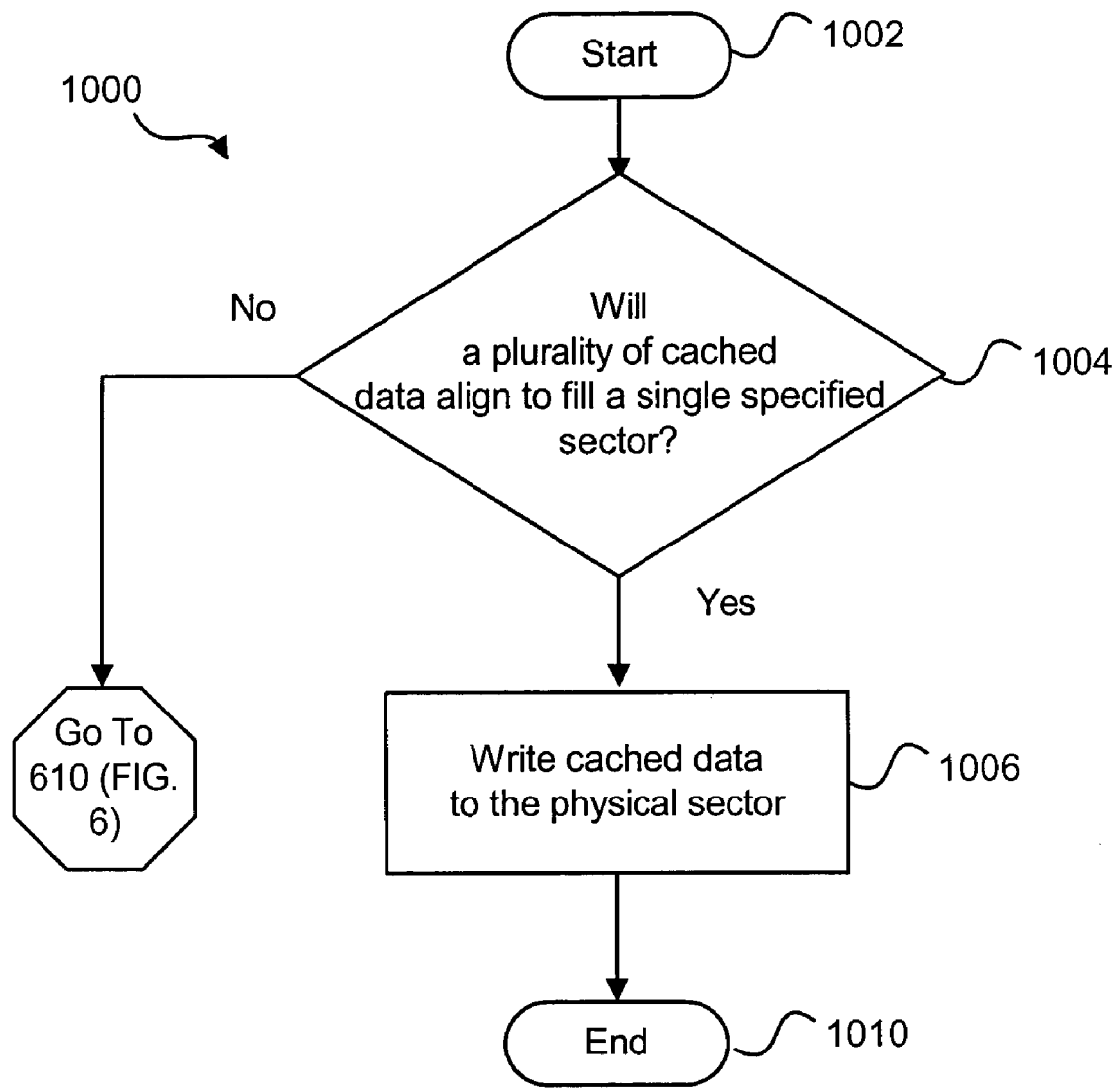

Referring now to FIG. 10, a process 1000 for transferring ("transfer process") data from one storage location in the disc drive 100 to another is shown in accordance with an embodiment of the present invention. More particularly, the transfer process 1000 provides an additional transfer routine that may be implemented as part of the storage process 600. As such, the transfer process 1000 may be inserted into the storage process 600 following the acknowledge operation 608. For illustrative purposes, and not by means of limitation, only a single iteration of the transfer process 1000 is shown in FIG. 10 and described below. However, it should be appreciated that the transfer process 1000 may be implemented or performed multiple times, sequentially or simultaneously.

The transfer process 1000 is performed by an operation flow beginning with a start operation 1002 and ending with a terminate operation 1012. As noted above, the transfer process 1000 is optionally inserted in the storage process 600 following the acknowledge operation 608, and thus the acknowledge operation 608 is the point in time during the storage process 600 when the start operation 1002 is initiated.

From the start operation 1002, the operation flow passes to a query operation 1004. The query operation 1004 determines whether the data entries, i.e., individual data packets, in the L1 cache 145 will align in a single sector 222 such that the entire storage capacity of the sector 222 is utilized after the data is written to the disc 108. As such, the data contained in a particular sequence of data packets will fill a sector 222 such that no read-write-modify operations (See FIG. 8) are necessary to commit the data to the sector 222 on the disc 108. The grouping of packets in this manner is referred to herein as the packets being "aligned." An example of packet alignment would be four 512 byte packets each having an intended destination on the disc 108 being the same, exact 2048 byte sector 222.

If the query operation 1004 detects "aligned" data entries, the query operation 1004 passes the operation flow to a write operation 1006. The write operation 1006 writes the data entries to the appropriate sector 222 specified for the data. In an embodiment, the write operation 1004 derives the location of the intended sector 222 based on the identification linked to the data in the L1 cache table 704. The operation flow then concludes at the terminate operation 1010. If the query operation 1004 determines that the data entries will not "align" to fill an entire physical sector 222, the operation flow of the storage process 600 is resumed at the transfer operation 610.

It will be clear that the present invention is well adapted to attain the ends and advantages mentioned as well as those inherent therein. While embodiments have been described for purposes of this disclosure, various changes and modifications may be made which are well within the scope of the present invention. For example, while the L2 cache region 232 is shown on the outer periphery of data disc 108, one skilled in the art would appreciate that the L2 cache region 232 could be located on any contiguous portion of data disc 108, such as within the inner zone 208 of FIG. 2. Additionally, one skilled in the art would appreciate that non-contiguous L2 cache regions 232 would fit within the scope of the present invention, such as allocating a certain amount of sector storage in every track 206 for the L2 cache storage so that the entire disc 108 would be interspersed with the L2 cache regions 232.

Furthermore, it is contemplated that the transfer process 1000 may be used in the storage of data from the L2 cache 232 to an intended location (i.e., a single sector 0.222) on the disc 108. To implement this embodiment, the write operation 612 includes a routine which queries to determine whether a plurality of the cached packets are "aligned" such that the storage of the data from these packets onto the disc 108 will fill a single physical sector 222. If so, data in these packets are written to the sector 22. Otherwise, the cached data is written to the appropriate sector on the disc 108 by the read-modify-write process 800 of FIG. 8. Numerous other changes may be made which will readily suggest themselves to those skilled in the art and which are encompassed in the spirit of the invention disclosed and as defined in the appended claims.

What is claimed is:

1. A method for storing data to a data storage device, the method comprising acts of:
   (a) receiving a write command issued by a sending interface, the write command being accompanied by data and specifying a storage location on the data storage device to which the data is to be recorded and wherein the data is formatted as a packet;
   (b) upon receipt of the data by the data storage device, storing the data to a first cache memory;
   (c) transferring the data from the first cache memory to a second cache memory; and
   (d) transferring the data from the second cache memory to the specified storage location pursuant to the write command, wherein the specified storage location is one of a plurality of storage locations that are each allocated a predetermined quantity of storage capacity, and wherein the data packet comprises a quantity of data bytes that is less than a quantity of data bytes that may be stored in the predetermined quantity of storage capacity.

2. A method as defined in claim 1, wherein the transferring act (c) is performed in response to a predetermined threshold condition being satisfied.

3. A method as defined in claim 2, wherein the predetermined threshold condition relates to a predetermined percent capacity of the first cache memory being used, the transferring act (c) comprising:
   transferring the data from the first cache memory to the second cache memory if a current percentage of storage capacity of the first cache memory being used is greater than or equal to the predetermined percent capacity.

4. A method as defined in claim 2, wherein the predetermined threshold condition relates to a predetermined percent capacity of the first cache memory being available, the transferring act (c) comprising:
   transferring the data from the first cache memory to the second cache memory if a current percentage of available storage capacity of the first cache memory is less than or equal to the predetermined percent capacity.

5. A method as defined in claim 2, wherein the predetermined threshold condition relates to whether the sending interface has issued a flush command requesting that the first cache memory be cleared of all data, the transferring act (c) comprising:
   transferring the data from the first cache memory to the second cache memory upon receipt by the data storage device of the flush command.

6. A method as defined in claim 2, wherein the predetermined threshold condition relates to whether data storage and retrieval operations of the data storage device are idle, the transferring act (c) comprising:
   transferring the data from the first cache memory to the second cache memory during a time when data storage and retrieval operations of the data storage device are idle.

7. A method as defined in claim 1, wherein the transferring act (d) is performed in response to a predetermined threshold condition being satisfied.

8. A method as defined in claim 7, wherein the predetermined threshold condition relates to a predetermined percent capacity of the second cache memory being used, the transferring act (d) comprising:

transferring the data from the second cache memory to the specified storage location if a current percentage of storage capacity of the second cache memory being used is greater than or equal to the predetermined percent capacity.

9. A method as defined in claim 7, wherein the predetermined threshold condition relates to a predetermined percent capacity of the second cache memory being available, the transferring act (d) comprising:

transferring the data from the second cache memory to the specified storage location if a current percentage of available storage capacity of the second cache memory is less than or equal to the predetermined percent capacity.

10. A method as defined in claim 7, wherein the predetermined threshold condition relates to whether the sending interface has issued a flush command requesting that the second cache memory be cleared of all data, the transferring act (d) comprising:

transferring the data from the second cache memory to the specified storage location upon receipt by the data storage device of the flush command.

11. A method as defined in claim 1, wherein the quantity of data bytes in the data packet aligns with a quantity of data bytes that can be stored in corresponding data regions of the first cache memory and the second cache memory.

12. A program storage device readable by a computer system tangibly embodying a program of instructions executable by the computer system to perform the method of claim 1.

13. A method for managing the storage of a plurality of data packets to a data storage device, the plurality of data packets being sent to the data storage device by a sending interface and accompanied by a write command specifying a plurality of storage locations on the data storage device to which the plurality of data packets are to be recorded, wherein each of the plurality of storage locations is allocated a predetermined quantity of storage capacity on the data storage device, the method comprising acts of:

(a) receiving the plurality of data packets;

(b) storing the plurality of data packets to a first cache memory;

(c) if one or more of the plurality of data packets are to be stored to a single storage location in a manner such that the one or more of the plurality of data packets will utilize all of the predetermined quantity of storage capacity allocated for the single storage location, transferring the one or more of the plurality of data packets to the single storage location; and (d) if one or more of the plurality of data packets are to be stored to a single storage location in a manner such that the one or more of the plurality of data packets will not utilize all of the predetermined quantity of storage capacity allocated for the single storage location, transferring the one or more of the plurality of data packets from the first cache memory to a second cache memory for subsequent transfer to the single storage location.

14. A method as defined in claim 13, further comprising:

(e) in response to the transferring act (d), transferring the one or more of the plurality of data packets from the second cache memory to the single storage location.

15. A method as defined in claim 14, wherein the transferring act (e) comprises:

(e)(i) reading a plurality of data entries stored on the single storage location and caching the plurality of data entries to a first memory;

(e)(ii) modifying the plurality of cached data entries by replacing one or more of the plurality of cached data entries with the one or more data packets, wherein at least one of the plurality of cached data entries is not replaced; and (e)(iii) writing the modified plurality of data entries to the single storage location.

16. A method as defined in claim 13, wherein the transferring act (d) is performed in response to a predetermined threshold condition being satisfied.

17. A method as defined in claim 16, wherein the predetermined threshold condition relates to a predetermined percent capacity of the first cache memory being used, the transferring act (d) comprising:

transferring the data from the first cache memory to the second cache memory if a current percentage of storage capacity of the first cache memory being used is greater than or equal to the predetermined percent capacity.

18. A method as defined in claim 16, wherein the predetermined threshold condition relates to a predetermined percent capacity of the first cache memory being available, the transferring act (d) comprising:

transferring the data from the first cache memory to the second cache memory if a current percentage of available storage capacity of the first cache memory available is less than or equal to the predetermined percent capacity.

19. A method as defined in claim 16, wherein the predetermined threshold condition relates to whether the sending interface has issued a flush command requesting that the first cache memory be cleared of all data, the transferring act (d) comprising:

transferring the data from the first cache memory to the second cache memory upon receipt by the data storage device of the flush command.

20. A method as defined in claim 16, wherein the predetermined threshold condition relates to whether data storage and retrieval operations of the data storage device are idle, the transferring act (d) comprising:

transferring the data from the first cache memory to the second cache memory during a time when data storage and retrieval operations of the data storage device are idle.

21. A method as defined in claim 13, wherein the one or more of the plurality of data packets comprise(s) a quantity of data bytes less than a quantity of data bytes that may be stored in the predetermined quantity of storage capacity allocated for the single storage location.

22. A method as defined in claim 13, wherein the one or more of the plurality of data packets is one data packet comprising a quantity of data bytes substantially equal to a quantity of data bytes that may be stored in the predetermined quantity of storage capacity allocated for the single storage location.

23. A program storage device readable by a computer system tangibly embodying a program of instructions executable by the computer system to perform the method of claim 13.

24. A data storage device for storing data received pursuant to a write command issued from a sending interface to the data storage device, the write command specifying a storage location on the data storage device to which the data is to be recorded, the data storage device comprising:

a first cache memory for temporarily storing the data upon receipt of the data from the sending interface; and means for storing the data for subsequent transfer to the specified storage location, wherein the storing means receives the data from the first cache memory in response to a first threshold condition being satisfied, wherein the specified storage location is one of a plurality of storage locations that are each allocated a predetermined quantity of storage capacity, and wherein the data received pursuant to the write command is formatted as a packet comprising a quantity of data bytes less than a quantity of data bytes that may be stored in the predetermined quantity of storage capacity.

25. A data storage device as defined in claim 24, wherein the first threshold condition relates to whether data storage and retrieval operations of the data storage device are idle.

26. A data storage device as defined in claim 24, wherein the first threshold condition relates to a predetermined percent capacity of the first cache memory being used.

27. A data storage device as defined in claim 24, wherein the storing means comprises:

means for transferring the data to the specified storage location in response to a second threshold condition being satisfied.

28. A data storage device as defined in claim 24, wherein the specified storage location is located on a data storage disc, the storing means being located on a portion of the data storage disc.

29. A data storage device as defined in claim 28, wherein the storing means is located on an outer circumferential portion of the data storage disc.

30. A data storage device as defined in claim 24, wherein the specified storage location is a sector on a data storage disc, the sector being allocated predetermined quantity of storage capacity on the sector, and wherein the quantity of data bytes of the data packet is less than the quantity of data bytes that may be stored in the predetermined quantity of storage capacity.

31. The data storage device as defined in claim 24 wherein the quantity of data bytes in the data packet aligns with a quantity of data bytes that may be stored in corresponding data regions of the first cache memory.

32. A data storage device for storing data received pursuant to a write command issued from a sending interface to the data storage device, the write command specifying a storage location on the data storage device to which the data is to be recorded, the data storage device comprising:

a first cache memory for temporarily storing the data upon receipt of the data from the sending interface; and means for storing the data for subsequent transfer to the specified storage location, wherein the storing means receives the data from the first cache memory in response to a first threshold condition being satisfied, and wherein the storing means comprises means for transferring the data to the specified storage location in response to a second threshold condition being satisfied.

33. A method for storing data to a data storage device, the method comprising acts of:

(a) receiving a write command issued by a sending interface, the write command being accompanied by data and specifying a primary memory storage location among a plurality of primary memory storage locations on a storage medium within the data storage device to which the data is to be recorded, and wherein the data is formatted as a packet;

(b) after (a), storing the data to a cache memory, having a plurality of cache storage locations that are each allocated a first predetermined quantity of storage capacity, and wherein the data packet comprises a quantity of data bytes that is equal to a quantity of data bytes that can be stored in the first predetermined quantity of storage capacity; and (c) transferring the data from the cache memory to the specified primary memory storage location pursuant to the write command, wherein the plurality of primary memory storage locations are each allocated a second predetermined quantity of storage capacity, and wherein the quantity of data bytes in the data packet is less than a quantity of data bytes that may be stored in the second predetermined quantity of storage capacity.

34. The method of claim 33 wherein the plurality of primary memory storage locations are sectors in at least one portion of at least one data storage disc, and the plurality of cache memory storage locations are sectors in at least one different portion of the at least one data storage disc.

* * * * *